(12) United States Patent
Vitulli et al.

(10) Patent No.: US 8,024,236 B2
(45) Date of Patent: Sep. 20, 2011

(54) METHOD AND APPARATUS FOR REDUCING SUPPLY ORDERS IN INVENTORY MANAGEMENT

(75) Inventors: Domenick Vitulli, Webster, NY (US); Richard R. T. Carling, Lakeville, NY (US); Thomas L. Schwartz, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 1161 days.

(21) Appl. No.: 10/646,605

(22) Filed: Aug. 22, 2003

(65) Prior Publication Data

US 2004/0103048 A1    May 27, 2004

Related U.S. Application Data

(60) Provisional application No. 60/428,615, filed on Nov. 22, 2002.

(51) Int. Cl.
*G06Q 10/00* (2006.01)
*G06F 7/00* (2006.01)

(52) U.S. Cl. .......................................... 705/28; 707/10
(58) Field of Classification Search .................... 705/28; 707/10
See application file for complete search history.

(56) References Cited

U.S. PATENT DOCUMENTS

| | | | |
|---|---|---|---|
| 5,127,012 A | 6/1992 | Hiliger | |
| 5,210,571 A | 5/1993 | Peloquin et al. | |
| 5,305,199 A | 4/1994 | LoBiondo et al. | |
| 5,325,156 A | 6/1994 | Ulinski | |
| 5,335,048 A | 8/1994 | Takano et al. | |
| 5,383,004 A | 1/1995 | Miller et al. | 355/206 |
| 5,490,089 A | 2/1996 | Smith et al. | |
| 5,502,543 A | 3/1996 | Aboujaoude | |
| 5,636,008 A | 6/1997 | LoBiondo et al. | |
| 5,666,585 A | 9/1997 | Nagira et al. | |
| 5,847,728 A * | 12/1998 | Lee | 347/33 |
| 5,877,692 A * | 3/1999 | Watanabe et al. | 340/679 |
| 5,911,776 A | 6/1999 | Guck | |
| 5,923,834 A | 7/1999 | Thieret et al. | |
| 5,953,707 A * | 9/1999 | Huang et al. | 705/10 |
| 5,991,732 A * | 11/1999 | Moslares | 705/8 |
| 6,012,071 A | 1/2000 | Krishna et al. | |
| 6,151,582 A * | 11/2000 | Huang et al. | 705/8 |
| 6,154,728 A * | 11/2000 | Sattar et al. | 705/28 |
| 6,188,991 B1 | 2/2001 | Rosenweig et al. | |
| 6,243,548 B1 | 6/2001 | Hebert et al. | |
| 6,263,170 B1 * | 7/2001 | Bortnem | 399/13 |
| 6,295,423 B1 * | 9/2001 | Haines et al. | 399/24 |
| 6,341,271 B1 * | 1/2002 | Salvo et al. | 705/28 |
| 6,390,582 B1 * | 5/2002 | Laharaty et al. | 347/14 |
| 6,486,439 B1 * | 11/2002 | Spear et al. | 219/136 |
| 6,490,543 B1 * | 12/2002 | Jaw | 702/184 |
| 6,556,926 B1 * | 4/2003 | Haines | 702/34 |

(Continued)

FOREIGN PATENT DOCUMENTS

JP    11-327381    11/1999

(Continued)

*Primary Examiner* — Matthew S Gart
*Assistant Examiner* — Ashford Hayles
(74) *Attorney, Agent, or Firm* — Lawrence P. Kessler

(57) ABSTRACT

A method and apparatus for managing replenishing of an inventory for serviceable equipment that requires fewer orders of replacement parts and resulting shipments from the provider of the parts to the inventory location by tracking parts in accordance with a predefined parameter to estimate current and future needs of the serviceable equipment.

20 Claims, 10 Drawing Sheets

U.S. PATENT DOCUMENTS

| | | | |
|---|---|---|---|
| 6,629,134 B2* | 9/2003 | Hayward et al. | 709/217 |
| 6,798,997 B1* | 9/2004 | Hayward et al. | 399/12 |
| 6,809,292 B2* | 10/2004 | Spear et al. | 219/130.5 |
| 6,866,195 B2* | 3/2005 | Knowles et al. | 235/385 |
| 6,868,397 B1* | 3/2005 | McCaslin | 705/28 |
| 6,910,076 B2* | 6/2005 | Lortz | 709/229 |
| 6,934,862 B2* | 8/2005 | Sharood et al. | 713/300 |
| 6,993,421 B2* | 1/2006 | Pillar et al. | 701/33 |
| 6,996,538 B2* | 2/2006 | Lucas | 705/28 |
| 7,013,092 B2* | 3/2006 | Hayward et al. | 399/24 |
| 7,031,933 B2* | 4/2006 | Harper | 705/26 |
| 7,043,523 B2* | 5/2006 | Haines et al. | 709/203 |
| 7,099,026 B1* | 8/2006 | Hren | 358/1.15 |
| 7,225,981 B2* | 6/2007 | Jongebloed | 235/385 |
| 7,434,730 B2* | 10/2008 | Jain | 235/380 |
| 7,483,964 B1* | 1/2009 | Jackson et al. | 709/221 |
| 7,496,533 B1* | 2/2009 | Keith | 705/37 |
| 2002/0005874 A1* | 1/2002 | Imai et al. | 347/33 |
| 2002/0042761 A1* | 4/2002 | Murray | 705/28 |
| 2002/0054316 A1* | 5/2002 | Abe | 358/1.14 |
| 2002/0059122 A1* | 5/2002 | Inoue et al. | 705/29 |
| 2002/0072998 A1* | 6/2002 | Haines et al. | 705/28 |
| 2002/0143642 A1* | 10/2002 | Harper | 705/26 |
| 2002/0161740 A1* | 10/2002 | Nakamura et al. | 707/1 |
| 2003/0040984 A1* | 2/2003 | Inami et al. | 705/27 |
| 2003/0046122 A1* | 3/2003 | Seymour | 705/7 |
| 2003/0065972 A1* | 4/2003 | Yamamoto et al. | 714/4 |
| 2003/0074428 A1* | 4/2003 | Haines | 709/220 |
| 2003/0093388 A1* | 5/2003 | Albright | 705/400 |
| 2003/0101107 A1* | 5/2003 | Agarwal et al. | 705/28 |
| 2003/0135431 A1* | 7/2003 | Schwartz et al. | 705/28 |
| 2003/0139982 A1* | 7/2003 | Schwartz et al. | 705/28 |
| 2003/0154144 A1* | 8/2003 | Pokorny et al. | 705/28 |
| 2003/0158795 A1* | 8/2003 | Markham et al. | 705/28 |
| 2003/0172072 A1* | 9/2003 | Smith | 707/10 |
| 2003/0220711 A1* | 11/2003 | Allen | 700/215 |
| 2004/0024659 A1* | 2/2004 | Mathew et al. | 705/28 |
| 2004/0039811 A1* | 2/2004 | Nakamura et al. | 709/223 |
| 2004/0098322 A1* | 5/2004 | Kalbfleisch et al. | 705/28 |
| 2004/0103048 A1* | 5/2004 | Vitulli et al. | 705/28 |
| 2004/0153187 A1* | 8/2004 | Knight et al. | 700/99 |
| 2004/0172341 A1* | 9/2004 | Aoyama et al. | 705/26 |
| 2005/0102203 A1* | 5/2005 | Keong | 705/28 |

FOREIGN PATENT DOCUMENTS

| | | |
|---|---|---|
| JP | 2000-071581 | 3/2000 |

* cited by examiner

MAINTENANCE

HOME | BACK | TOP | JUMP | CALL ESCALATION | ORC MAINTENANCE TRACKING TABLE | DAILY MAINTENANCE TASK LIST

ADJUST ORC QTY — 725
RECEIVE ORC — 750
SET ORC LEVELS — 775

ORC INVENTORY PART DETAILS — 600

| FEATURE | VALUE |
|---|---|
| ORC | 21003 |
| DESCRIPTION | YELLOW DRY INK |
| AVERAGE LIFE | 25,000 PAGES |
| QTY SINCE INSTALL | 0 |
| UNIT QTY ON HAND | 0 |
| QTY PER PACKAGE | |
| SUGGESTED QTY ON HAND | 8 |
| ORC PACKAGE REORDER POINT | 2 |
| ORC ORDER DATA | |

FIG. 6

MAINTENANCE

HOME | BACK | TOP | JUMP | CALL ESCALATION | ORC MAINTENANCE TRACKING TABLE | DAILY MAINTENANCE TASK LIST

CALCULATE ORC REORDER LEVELS

| CONFIGURATION SET POINTS | VALUE | INSTRUCTIONS |
|---|---|---|
| AVERAGE MONTHLY PRINT VOLUME (A4 EQUIVALENT) | 200000 | STEP BY STEP INSTRUCTIONS HOW TO USE THE FORM ON THE LEFT SIDE TO ACT COMING SOON. |
| WORK DAYS PER MONTH | 30 | |
| ORDERS PER MONTH | 1 | |
| DAYS TO FULFILL ORDER | 5 | |
| SAFETY FACTOR | 0.2 | |
| RECALCULATE | | |

FIG. 8

METHOD AND APPARATUS FOR REDUCING SUPPLY ORDERS IN INVENTORY MANAGEMENT

CROSS REFERENCE TO RELATED APPLICATION

Reference is made to and priority claimed from U.S. Provisional Application Ser. No. 60/428,615, filed Nov. 22, 2002 entitled METHOD AND APPARATUS FOR REDUCING SUPPLY ORDERS IN INVENTORY MANAGEMENT.

CROSS-REFERENCE TO RELATED APPLICATIONS

This application is related to the following applications which are hereby incorporated by reference:
1. U.S. patent application Ser. No. 10/011,331 filed in the names of Thomas L. Schwartz, et al., and entitled, OPERATOR REPLACEABLE COMPONENT LIFE TRACKING SYSTEM, filed on Nov. 5, 2001.
2. U.S. patent application Ser. No. 10/008,283, filed in the names of Richard R. T. Carling, et al., and entitled, PERSONALIZATION OF OPERATOR REPLACEABLE COMPONENT LIFE PREDICTION BASED ON REPLACEABLE COMPONENT LIFE HISTORY, filed on Nov. 5, 2001.
3. U.S. patent application Ser. No. 10/028,000, filed in the names of Thomas L. Schwartz, et al., and entitled, LINKING ORC LIFE TRACKING/USAGE WITH INVENTORY MANAGEMENT, filed on Dec. 20, 2001.
4. U.S. patent application Ser. No. 10/028,134, filed in the names of Thomas L. Schwartz, et al., and entitled, ORC ONLINE INVENTORY MANAGEMENT SYSTEM, filed on Dec. 20, 2001.
5. U.S. patent application Ser. No. 10/166,493, filed in the names of Richard R. T. Carling, et al., and entitled, INTEGRATED SERVICE DATA MANAGEMENT SYSTEM, filed on Jun. 10, 2002.

FIELD OF THE INVENTION

The present invention relates to maintaining inventories using databases, and more particularly, to reducing the number of orders required to stock an inventory that is used to maintain serviceable equipment.

BACKGROUND OF THE INVENTION

The concept of inventory management has been applied to various types of products by numerous systems. Among these are "point of sale" systems that are common within supermarkets. Typically, "point of sale" systems are used to inventory products offered for sale that are identified with an identifiable indicia, such as a bar code. Upon being purchased, the bar code for the product is scanned and the purchase is recorded. Additionally, the "point of sale" system inventories the products once they are purchased and itemizes the number of each individual product item that is sold for accounting purposes. "Point of sale" systems also provide assistance in accounting and taxes. While "point of sale" systems are useful for keeping inventory of products that can be individually scanned upon the sale of the product, the usefulness of "point of sale" systems is limited to stores that move through inventory in relatively large numbers. In terms of inventory management, the usefulness of "point of sale" systems is limited to products that can be scanned at the time of purchase in order to perform inventory management. The "point of sale" concept provides no assistance for maintaining inventories that support serviceable pieces of equipment or towards reducing the number of orders that must be filled to maintain such an inventory.

A prior art teaching contained in U.S. Pat. No. 6,154,728 issued to Sattar, et al. (Sattar), discloses that the inventory management and control of many field replaceable units can be accomplished in a distributed inventory management scheme. Sattar requires that the field replaceable units input a status that can be tracked by the distributed inventory management system. Sattar requires that the field replaceable units must report a status as non-functional in order for the distributed inventory management system to understand that the inventory needs modification for that non-functional field replaceable unit. Therefore, the field replaceable unit must actually break down and the system that the field replaceable unit is in will, accordingly, also break down. Therefore, Sattar has a shortcoming in that it does not teach an inventory management system that can predict inventory needs prior to a breakdown of the replaceable parts within the system.

Numerous pieces of serviceable equipment exist within the prior art that have components that wear and consumables that become exhausted during normal use of the system. These systems, typically, require periodic maintenance to replace worn components and consumables that are actually exhausted or in danger of becoming exhausted. Typically, these complicated systems require service professionals such as field service engineers to repair or replace the components and consumables in these systems that wear during periods of normal use. In a number of these complicated systems, the period of time that the system is not working or, working at less than optimum performance, is critical. For many of these systems, it is intended to keep the system running continuously. A digital printing system is one such system. Minimizing down time is critical to the owners and operators of digital printers.

The prior art has recognized that it is important to count the number of uses that are applied to printing devices. One such prior art reference, U.S. Pat. No. 5,383,004 issued to Miller et al. (Miller), discloses a method and apparatus for normalizing the counting of sheets that are printed to compensate for varying sizes of sheets that are printed and provide a more accurate record of the wear on components within the system. However, Miller does not teach a system that will provide the operator with the specific knowledge of the wear on the components and consumables that become exhausted within the system, thus enabling the operator with the ability to perform maintenance on the system at optimum times. By not providing optimum timing for the replacement of components that wear during normal use, the resulting prints are not assured of being of optimum quality. Therefore, the teachings of Miller have a shortcoming in that the operator is not made aware of the current condition of the numerous parts within a printing system that will wear during use.

In view of the foregoing discussion there remains a need within the prior art for an operator controlled inventory management system that can anticipate inventory requirements, and there is also a desire to minimize the number of orders for replaceable components and consumables placed by owner/operators of serviceable equipment. There is a need within the art for a reduction in orders and corresponding shipments, which will result in numerous financial benefits to both the supplier and the customer.

SUMMARY OF THE INVENTION

The invention addresses the aforementioned needs within the prior art by providing a method and system for inventory management wherein inventory needs are anticipated, replacement supplies are ordered and delivered using a greatly reduced number of shipments resulting in savings to the supplier of the parts as well as the consumer. An inventory management system that allows the customer to manage their inventory as well as place orders to replenish the items contained in their inventory. For each part that is stocked within the inventory, there is a recommended inventory level and a minimum inventory level. The recommended inventory levels and minimum inventory levels can be modified because they exist as values, which are dependent on variables such as average monthly print volume. The operator has the ability to record receipt of new inventory as well as record the consumption of inventory (consumption usually happens automatically). When any inventoried part reaches the minimum inventory level, the system generates an inventory recommendation report. The inventory recommendation report identifies a list of inventoried parts that need to be ordered to restore the inventory back to recommended levels. The operator can then use this report to replenish inventoried parts via an e-commerce transaction, e-mail, facsimile or similar mode of communication. The invention results in minimizing the number of orders that need to be placed by customers in order to stock consumables and operator replaceable components (ORCs).

The inventory management system and method of the invention, allows an operator to manage an inventory by providing a system for generating order forms used having at least one piece of equipment requiring routine maintenance for a plurality of items. Each of the items is associated with a parameter that provides an estimate of servicing needs for the item. An inventory of replacement items is operatively coupled to a computational element and to each of the parameters. A tracking device is operatively coupled to the computational element to derive a criteria to generate at least one order form that details current and future requirements of the items, for the piece of equipment, that are stocked within the inventory.

BRIEF DESCRIPTION OF THE DRAWINGS

FIG. 6 is an illustration of the screen that is presented for part details of a specific ORC within inventory;

FIG. 8 is an illustration of a screen that is presented for calculating ORC reorder levels.

DETAILED DESCRIPTION OF THE PREFERRED EMBODIMENTS

Figure 1:
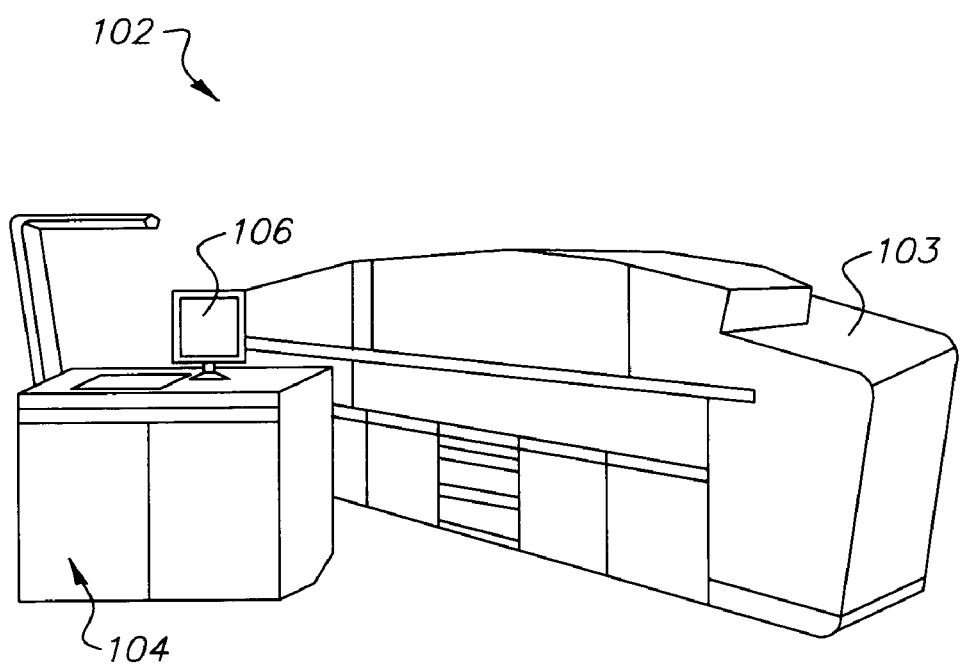
FIG. 1 is a perspective view of an apparatus associated with the preferred embodiment of an inventory management system of the invention.
Figure 2:
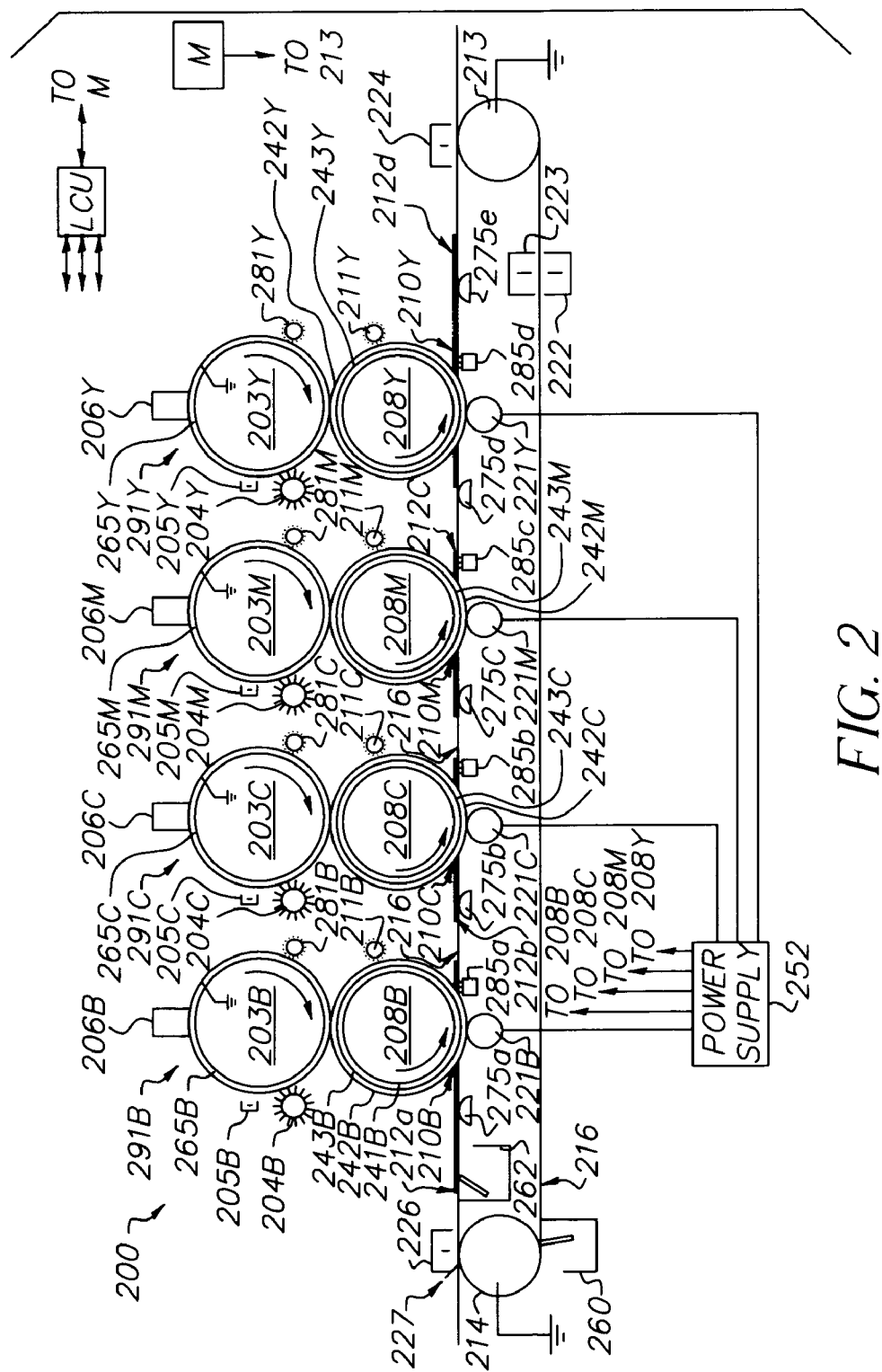
FIG. 2 is a schematic illustration of the elements of the piece of equipment of FIG. 1, including ORC's within the equipment.

Referring to FIGS. 1 and 2, which is an illustration of a system 102, including a digital printing apparatus 103 is configured with Operator Replaceable Component (ORC) devices that enable a typical operator to perform the majority of maintenance on the system without requiring the services of a field engineer. Digital printing apparatus 103, in the preferred embodiment, is for example a NexPress™ 2100, however, the present invention pertains to any suitable apparatus such as a digital printer. As illustrated in FIG. 1, system 102 includes a user interface 104 which in the preferred embodiment is a NexStation® adjacent to the NexPress™ 2100. In general, many interactive devices can function as user interface 104. Specifically, the ORC devices as envisioned by the preferred embodiment herein, are those components used within digital printing apparatus that wear with use. These ORC devices have predictable life times that can be anticipated by parameters relative to the use of the digital printing apparatus 103. Therefore, it is possible to anticipate when these ORC devices will need to be replaced before the wear on them results in less than desirable performance in the apparatus 103.

System 102 has multiple computational elements located in both the digital printing apparatus 103 and the NexStation® 104. The computational devices include, in part, a device referred to herein as the digital front end (DFE) and a graphical user interface (GUI) 106 that interfaces with the database management system within the DFE. It should be understood that while the preferred embodiment details a system 102 with a digital printing apparatus 103 having at least one computational element which interfaces with another computational element associated with GUI 106, similar systems can be provided with more computational elements, and that these variations will be readily understood by those skilled in the art. In the preferred embodiment, GUI 106 on the NexStation® 104 provides the operator with the ability to view the current status of ORC devices on the NexPress™ 2100 digital printing apparatus 103, and to perform maintenance in response to maintenance information provided on the graphical display of GUI 106 as well as respond to alerts that are provided from the DFE.

The database management system will receive data for each of the ORC devices that details the usage of each of the ORC devices based on the number of prints made, the types of paper being used, the color composition of the printed pages as well as various other sensor inputs. The database management system then takes the received data and creates a life tracking system that keeps track of the remaining life of the ORC devices, and can inform the operator of such life status via the GUI 106. The preferred embodiment employs tables displayed on the GUI 106 to inform the operators of the current status of the ORC devices. However, it should be noted that numerous variations are possible including, but not limited to, direct messages related to a single ORC device, various types of alarms, or even graphical messages on the GUI 106. The database management system will also prompt the operator when any of the ORC devices need to be replaced. The digital printing apparatus 103 used with the present invention provides tracking of the ORC devices in an ORC tracking table along with an automated transmission of the ORC tracking table to the GUI 106. The preferred embodiment of the present invention uses page count and parameters related to customer usage to create the ORC tracking table. The concepts embodied by the present invention empower the operator with the ability of performing maintenance on a sophisticated apparatus such as a digital press.

When an operator replaces an ORC, the life counter for that ORC is reset. Table 1 below illustrates one exemplary tracking table for ORC devices that would typically be provided on GUI 106 within the preferred embodiment of the invention.

TABLE 1

| Catalog Number | Description | Average Life | Remaining Life | Replaced Qty | Machine Qty |
|---|---|---|---|---|---|
| *21004 | NexPress ™ DryInk ®, Black | 12,500 | 23 | 56 | 1 |
| 21054 | Pressure Roller Cleaner Sheet | 40,000 | 312 | 17 | 1 |
| *21001 | NexPress ™ DryInk ®, Cyan | 25,000 | 2,852 | 28 | 1 |
| *21002 | NexPress ™ DryInk ®, Magenta | 25,000 | 3,257 | 28 | 1 |
| *21003 | NexPress ™ DryInk ®, Yellow | 25,000 | 6,941 | 28 | 1 |
| **21026 | Contact Skive Finger | 45,000 | 8,190 | 120 | 8 |
|  | General Press Maintenance | 50,000 | 11,011 | 14 | 1 |
| *21030 | Fuser Fluid | 100,000 | 13,063 | 6 | 1 |
| *21031 | Fuser Cleaning Web | 100,000 | 18,699 | 6 | 1 |
| 21032 | Transport Web | 100,000 | 18,699 | 6 | 1 |
| 21038 | Cleaning Web | 550,000 | 22,578 | 1 | 1 |
| 21063 | Cleaner Sump | 125,000 | 28,814 | 4 | 1 |
| *21051 | DryInk ® Collection Bottle | 135,000 | 34,125 | 5 | 1 |
| 21025 | Fuser Roller | 150,000 | 39,002 | 4 | 1 |
| 21059 | Fuser Pads | 475,000 | 40,992 | 1 | 1 |
| 21029 | Donor Roller | 375,000 | 45,671 | 1 | 1 |
| 21061 | Metering Roller | 875,000 | 50,773 | 0 | 1 |
| 21060 | Metering Blade | 475,000 | 52,349 | 1 | 1 |
|  | Perfector Belt Maintenance | 200,000 | 55,891 | 3 | 1 |
| 21027 | Pressure Roller | 200,000 | 56,129 | 3 | 1 |
| **21041 | Primary/PreClean Wire | 200,000 | 60,009 | 48 | 16 |
| **21042 | Conditioner/Tackdown Wire | 200,000 | 61,892 | 33 | 11 |
| **21036 | IC/BC Cleaning Blade | 200,000 | 63,167 | 24 | 8 |
| **21058 | Wiper Pads | 200,000 | 64,287 | 12 | 4 |
| **21044 | Narrow Primary Grid | 7,000,000 | 87,094 | 0 | 4 |
| **21045 | Wide Primary Grid | 3,000,000 | 87,094 | 0 | 8 |
| **21047 | Conditioning Charger Grid | 1,000,000 | 91,075 | 1 | 2 |
| **21050 | PreClean Grid | 2,000,000 | 91,075 | 0 | 4 |
| **21035 | IC/BC Cleaning Brush | 2,200,000 | 105,245 | 0 | 8 |
| **21039 | Imaging Cylinder | 230,000 | 105,245 | 3 | 4 |
| 21017 | Developer, Cyan | 300,000 | 220,145 | 3 | 1 |
| 21018 | Developer, Magenta | 300,000 | 220,145 | 3 | 1 |
| 21019 | Developer, Yellow | 300,000 | 220,145 | 3 | 1 |
| 21020 | Developer, Black | 300,000 | 280,569 | 3 | 1 |
| **21040 | Blanket Cylinder | 330,000 | 301,738 | 3 | 4 |
| 21064 | Water Filter Cartridge | 500,000 | 491,813 | 1 | 1 |
| 21055 | Fuser Lamp | 2,000,000 | 1,000,865 | 0 | 1 |
| **21074 | BC Charger | 1,800,000 | 1,100,865 | 0 | 4 |
| 21057 | Pressure Roller Lamp | 2,000,000 | 1,300,865 | 0 | 1 |
| **21043 | PreClean Charger | 2,000,000 | 1,300,865 | 0 | 4 |
| **21046 | Primary Charger | 2,000,000 | 1,300,865 | 0 | 4 |
| 21048 | Tackdown Charger | 2,000,000 | 1,300,865 | 0 | 1 |
| **21033 | Imaging Cylinder Cleaner | 4,000,000 | 3,300,865 | 0 | 4 |

Table 1 provides a list of ORC devices with the ORC devices having the shortest remaining life listed first. Each ORC device is given a catalog number to simplify the ordering process and a description to assist the operator with simple recognition of the ORC device. As readily apparent from Table 1, the ORC devices in Table 1 are listed in increasing amounts of remaining life of the ORC devices In Table 1, under the column heading Catalog Number, several of the items listed have a single asterisk (*) in the first position, before the actual Catalog Number. This asterisk (*) is not actually produced on the GUI 106 but is placed on Table 1 as shown to indicate the items that are typically referred to as consumables rather than ORC devices. Consumables, in the preferred embodiment, have sensors that detect when they must be replenished or replaced. The items in Table 1 having a single asterisk (*) before their Catalog Number generally indicate consumables such as DryInk® or fluid. However, there are also items having a single asterisk (*) before their Catalog Number (such as the Fuser Cleaning Web or the DryInk® collection bottle) that are not consumables in the general sense but use a sensor to detect if the items need to be replaced within the preferred embodiment. Since the indication that the replacement of items with a single asterisk (*) in front of their Catalog Number, is signified by a sensor rather than an expected life span as is the case for an ORC device, anticipating the exhaustion of these items with a single asterisk (*) in front of their catalog number must be accomplished by the application of use factors for the printing device. Therefore, the items with a single asterisk (*) before their Catalog Number will have an expected life span listed in the Remaining Life column, and their respective object files will reflect their expected life span based on use factors. Accordingly, an order sheet that is provided by the invention (discussed below) will preferably take into account the present and future needs for ORC devices as well as those consumable and other items that have an asterisk (*) in front of their Catalog Number.

Additional information is provided on GUI 106 as illustrated in Table 1, such as Average Life of that specific type of ORC device, the Replaced Quantity which is the number of times that a specific ORC device has been replaced, and Machine Quantity. The Machine Quantity is the physical number of times that a specific ORC exists within the system. The ORC devices that have an entry greater than one within the Machine Quantity column, represent ORC devices within the preferred embodiment that would require the use of a special tracking feature that is envisioned by the invention for tracking their expected life span. The ORC devices within the Machine Quantity column that have an entry greater than one, are indicated with a double asterisk () before their respective Catalog Numbers in Table 1, and can be interchanged within the printing apparatus; as such, individual life predictions are difficult. The feature of the present invention tracks the expected life for those items with a double asterisk () before their respective Catalog Numbers in Table 1 even when they are moved within a single printing apparatus or even among numerous printing apparatus at a single location. Additional use of the columns of information in Table 1 will be discussed further below.

Referring now to FIG. 2 of the accompanying drawings, the area inside digital printing apparatus 103 is schematically illustrated, showing the image reproduction apparatus, designated generally by the numeral 200. The image reproduction apparatus 200 is in the form of an electrophotographic reproduction apparatus, and more particularly a color reproduction apparatus, wherein color separation images are formed in each of four color modules and transferred in register to a receiver member as a receiver member is moved through the apparatus while supported on a paper transport web (PTW) 216. The image reproduction apparatus 200 illustrates the image forming areas for digital printing apparatus 103 having four color modules, although the present invention is applicable to printers of all types and more specifically to apparatus having components that wear with use. FIG. 2 illustrates a system having numerous parts that wear with use and must be periodically replaced.

The elements in FIG. 2 that are similar from module to module have similar reference numerals with a suffix of B, C, M and Y referring respectively to the color module for which it is associated: black, cyan, magenta and yellow. Each module (291B, C, M, Y) is of similar construction. The PTW 216, which may be in the form of an endless belt, operates with all the modules 291B, C, M, Y and the receiver member is transported by the PTW 216 from module to module. Four receiver members, or sheets, 212a, b, c and d are shown simultaneously receiving images from the different modules, it being understood as noted above that each receiver member may receive one color image from each module and that in this example up to four color images can be received by each receiver member. The movement of the receiver member with the PTW 216 is such that each color image transferred to the receiver member at the transfer nip of each module is a transfer that is registered with the previous color transfer so that a four color image formed on the receiver member has the colors in registered superposed relationship on the receiver member. The receiver members are then serially detacked from the PTW 216 and sent to a fusing station (not shown) to fuse or fix the dry toner images to the receiver member. The PTW 216 is reconditioned for reuse by providing charge to both surfaces using, for example, opposed corona chargers 222, 223 which neutralize the charge on the two surfaces of the PTW 216. These chargers 222, 223 are operator replaceable components within the preferred embodiment and have an expected life span after which chargers 222, 223 will require replacement.

Each color module includes a primary image forming member (PIFM), for example a rotating drum 203B, C, M and Y, respectively. The drums rotate in the directions shown by the arrows and about their respective axes. Each PIFM 203B, C, M and Y has a photoconductive surface, upon which a pigmented marking particle image is formed. The PIFM 203B, C, M and Y have predictable life times and constitute ORCs. The photoconductive surface for each PIFM 203B, C, M and Y within the preferred embodiment is actually formed on outer sleeves 265B, C, M and Y, upon which the pigmented marking particle image is formed. These outer sleeves 265B, C, M and Y, have life times that are predictable and therefore, are ORCs. In order to form images, the outer surface of the PIFM is uniformly charged by a primary charger such as corona charging devices 205B, C, M and Y, respectively or other suitable charger such as roller chargers, brush chargers, and the like. The corona charging devices 205B, C, M and Y each have a predictable life time and are ORCs. The uniformly charged surface is exposed by suitable exposure means, such as a laser 206B, C, M and Y, respectively or more preferably a light emitting diode array or other electro-optical exposure device or even an optical exposure device to selectively alter the charge on the surface of the outer sleeves 265B, C, M and Y, of the PIFM 203B, C, M and Y to create an electrostatic latent image corresponding to an image to be reproduced. The electrostatic image is developed by application of pigmented charged marking particles to the latent image bearing photoconductive surface by a development station 281B, C, M and Y, respectively. The development station has a particular color of pigmented toner marking particles associated respectively therewith. Thus, each module creates a series of different color marking particle images on the respective photoconductive surface of its rotating drum. The development stations 281B, C, M and Y, have predictable life times before they require replacement and are ORCs. In lieu of a photoconductive surface of a rotating drum, which is preferred, a photoconductive belt can be used.

Each marking particle image formed on a respective PIFM is transferred electrostatically to an intermediate transfer module (ITM) 208B, C, M and Y, respectively. The ITM 208B, C, M and Y have an expected life time and are, therefore, considered to be ORCs. In the preferred embodiment, each ITM 208B, C, M and Y, has an outer sleeve 243B, C, M and Y respectively, that contains the surface that the image is transferred to from PIFM 203B, C, M and Y. These outer sleeves 243B, C, M and Y are considered to be ORCs with predictable life times. The PIFMs 203B, C, M and Y are each caused to rotate about their respective axes by frictional engagement with their respective ITM 208B, C, M and Y. The arrows in the ITMs 208B, C, M and Y indicate the direction of their rotation. After transfer, the toner image is cleaned from the surface of the photoconductive drum by a suitable cleaning device 204B, C, M and Y, respectively to prepare the surface for reuse for forming subsequent toner images. Cleaning devices 204B, C, M and Y are considered ORCs by the present invention.

Marking particle images are respectively transferred onto surfaces 242B, C, M and Y for each of the outer sleeves 243B, C, M and Y, of ITMs 208B, C, M and Y, and then transferred to a toner image receiving surface of a receiver member, which is fed into a nip between the intermediate image transfer member drum and a transfer backing roller (TBR) 221B, C, M and Y, respectively. The TBRs 221B, C, M and Y have predictable life times and are considered to be ORCs by the invention. Each TBR 221B, C, M and Y, is suitably electrically biased by a constant current power supply 252 to induce the charged toner particle image to electrostatically transfer to a receiver sheet. Although a resistive blanket is preferred for TBR 221B, C, M and Y, the TBR 221B, C, M and Y can also be formed from a conductive roller made of aluminum or other metal.

The receiver member is fed from a suitable receiver member supply (not shown) and is suitably "tacked" by the charger 226 to the PTW 216, and moves serially into each of the nips 210B, C, M and Y where it receives the respective marking particle image in a suitable registered relationship to form a composite multicolor image. As is well known, the colored pigments can overlie one another to form areas of colors different from that of the pigments. The receiver member exits the last nip and is transported by a suitable transport mechanism (not shown) to a fuser where the marking particle image is fixed to the receiver member by application of heat and/or pressure and, preferably both. A detack charger 224 may be provided to deposit a neutralizing charge on the receiver member to facilitate separation of the receiver member from the PTW 216. The tacking charger 226 and the detack charger 224 are other components that are considered to be ORCs within the invention. The receiver member with the fixed marking particle image is then transported to a remote location for operator retrieval. The respective ITMs 208B, C, M and Y are each cleaned by respective cleaning devices 211B, C, M and Y to prepare it for reuse. Cleaning devices 211B, C, M and Y are considered by the invention to be ORCs having life times that can be predicted.

Appropriate sensors (not shown) of any well known type, such as mechanical, electrical, or optical sensors for example, are utilized in the reproduction apparatus 200 to provide control signals for the apparatus. Such sensors are located along the receiver member travel path between the receiver member supply through the various nips to the fuser. Further sensors may be associated with the PIFM photoconductive drum, the intermediate ITM drum, the transfer backing member, and various image processing stations. As such, the sensors detect the location of a receiver member in its travel path, and the position of the PIFM and photoconductive drum in relation to the image forming processing stations, and respectively produce appropriate signals indicative thereof. Such signals are fed as input information to a microprocessor-based logic and control unit (LCU) that interfaces with a computational element. Based on such signals and a suitable program for the microprocessor, the LCU produces signals to control the timing operation of the various electrostatographic process stations for carrying out the reproduction process and to control the driving by motor M of the various drums and belts. The production of a program for a number of commercially available microprocessors, which are suitable for use with the invention, is a conventional skill well understood in the art. The particular details of any such program would, of course, depend on the architecture of the designated microprocessor.

The receiver members utilized with the reproduction apparatus 200 can vary substantially. For example, they can be thin or thick paper stock (coated or uncoated) or transparency stock. As the thickness and/or resistivity of the receiver member stock varies, the resulting change in impedance affects the electric field used in nips 210B, C, M and Y to urge transfer of the marking particles to the receiver members. Moreover, a variation in relative humidity will vary the conductivity of a paper receiver member, which also affects the impedance and hence changes the transfer field. Such humidity variations can affect the expected life time of ORCs.

In feeding a receiver member onto PTW 216, charge can be placed on the receiver member by charger 226 to electrostatically attract the receiver member and "tack" it to the PTW 216. A blade 227 associated with the charger 226 may be provided to press the receiver member onto the belt and remove any air trapped between the receiver member and the PTW 216. The PTW 216, the charger 226 and the blade 227 are considered ORCs.

The endless PTW 216 is entrained about a plurality of support members. For example, as shown in FIG. 2, the plurality of support members are rollers 213, 214 with preferably roller 213 being driven by motor M to drive the PTW 216. Support structures 275a, b, c, d and e are provided before entrance and after exit locations of each transfer nip to engage the belt on the backside and alter the straight line path of the belt to provide for a degree of wrap of the belt about each respective ITM. This wrap allows for a reduced pre-nip ionization and for a post-nip ionization controlled by the post-nip wrap. The nip is the area where the pressure roller contacts the backside of the belt or in the case where no pressure roller is used, where the electrical field is substantially applied. However, the image transfer region of the nip is a smaller region than the total wrap. Pressure applied by the TBRs 221B, C, M and Y is upon the backside of the PTW 216 and forces the surface of the compliant ITM to conform to the contour of the receiver member during transfer. The TBRs 221B, C, M and Y may be replaced by corona chargers, biased blades or biased brushes, each of which would be considered by the invention to be ORCs. Substantial pressure is provided in the transfer nip to realize the benefits of the compliant ITM, these benefits are a conformation of the toned image to the receiver member and image content on both a microscopic and macroscopic scale. The pressure may be supplied solely by the transfer biasing mechanism or additional pressure applied by another member such as a roller, shoe, blade or brush, all of which are ORCs as envisioned by the present invention.

Figure 3:
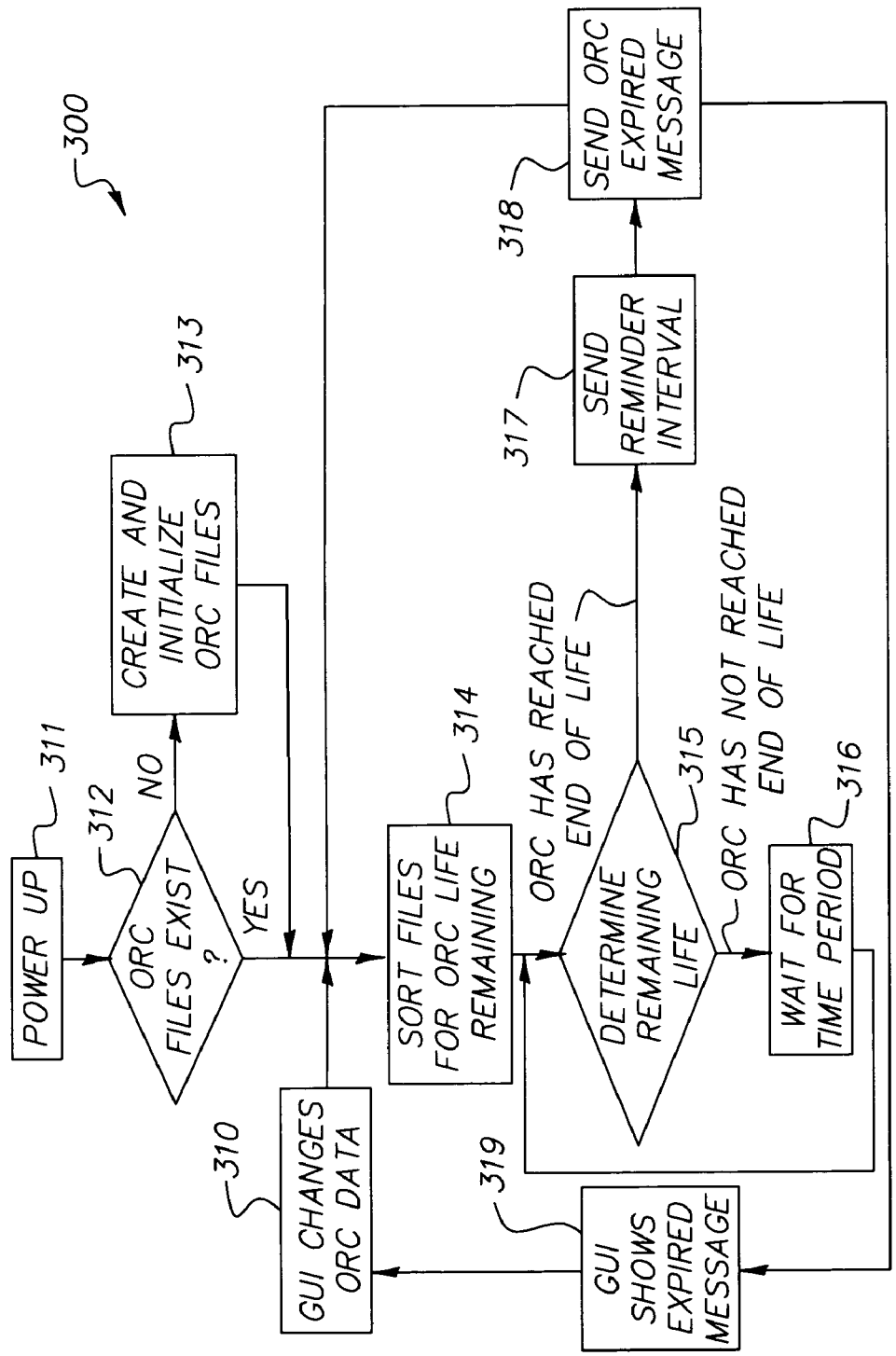
FIG. 3 is a flowchart illustrating the ORC tracking system employed by the invention.

FIG. 3 is a flowchart that details the operations that are performed by the inventory management system of the present invention. Tracking of ORCs, designated by the numeral 300, is initialized at power up 311 and then begins by executing "ORC files exist" step 312. "ORC files exist" step 312 looks at the object files for the ORC devices to check that all necessary object files are present. If any of the necessary object files are not found, then "create and initialize ORC files" step 313 is run to install these files.

The object files within the preferred embodiment are data structures called records. Each record used as an object file contains information related to a particular ORC device. Other types of data structures can also be used to retain the information related to specific ORC devices, however records are the type of data structure used by the preferred embodiment of the invention. Within the preferred embodiment, entries are made within each of the object files for life history of that particular type of ORC device, the predicted life for that specific ORC device that is currently installed, and the amount of use on that ORC device that is currently installed. Additionally, each object file can contain a number of setpoints that can be accessed by various computational elements within apparatus 103. The provisions of setpoints that can be accessed by the computational element to the GUI 106, the DFE or any other computational elements in the digital printing apparatus 103 is a feature of the preferred embodiment and it will be readily understood that other architectural configurations can be substituted without departing from the spirit of the present invention.

Another item within each of the object files for an ORC device is whether that ORC device is to be dormant. The term dormancy, as used herein, refers to whether a parameter for an ORC device is to be used as a trigger point within the apparatus 103 to alert the operator to a potential problem with that ORC device. The dormancy feature can be either enabled or disabled. The rationale for having a dormancy feature is that with certain types of ORC devices, it might be desirable for the operator to employ visual rather than automatic notification that the life time of an ORC device has expired. A visual notification would typically be desirable when it is believed that system predictors do not provide sufficient accuracy and that physically looking at the printed output to notice any problems is the best manner by which to determine problems occurring from that ORC. If the dormancy feature for a specific ORC device is disabled, then the trigger mechanism is enabled for that ORC device and will be a potential trigger for an operator alert once the expected life time of that ORC device has expired.

Another entry that is contained in the object file is a reminder that is sent to the operator alerting the operator that an ORC device has failed, or will soon fail. As shown in FIG. 3, the "send reminder interval" 317 alerts the operator when the expected life time for an ORC device has expired. The specifics for "send reminder interval" 317 are acquired by accessing the object file for the ORC device in question. The "send reminder interval" 317 is a message to alert the operator via the GUI 106 and is made by accessing the object file for that specific ORC device and reading entries in the object file. As envisioned by the preferred embodiment, the reminder interval is a parameter in the object file that is accessed to acquire the reminder period that is used to remind the operator that the expected life time for a specific ORC has expired. This period can be a time period used to set a timer from which the operator can repetitively be alerted, or it can be measured in terms of use of that ORC device, which in the preferred embodiment would be a number of sheets printed. The time period can also be set in terms of times and dates to alert the operator per minute, per hour, per day or per week.

Other information that is contained in the object file for an ORC is information detailing the quantity of that specific ORC device that has been used in the machine over the life time of the machine. Additionally, historical data for each one of the ORC devices for that specific ORC device is provided for increased capabilities in the database manager system. In this manner, a computational element can access the object file for a specific ORC device and acquire all the historical data for that ORC device and calculate an expected life time for that ORC based on the history of that ORC as it has been used in the digital printing system 103 for that particular user. Historical data can be used to compute expected life times dynamically and provides for a high degree of personalization for a digital printing system. Personalization is important because of the numerous variables that can effect the life time of the ORC devices. These variables will be discussed below in more detail.

Still referring to FIG. 3, after the ORC tracking system 300 verifies that the necessary ORC files exist, the system branches to "sort files for ORC life remaining" step 314, which is a routine that looks at the ORC object files and sorts through them to determine which ORC device should be expected to expire first. The ORC devices within the preferred embodiment have their remaining life determined in terms of the number of remaining pages of a particular size (e.g., A4) that can be expected to be printed before failure, and this is the type of list shown in Table 1; however, it should be noted that Table 1 provides only an exemplary list, and does not provide an exhaustive list of every ORC envisioned by the invention. While the preferred embodiment measures remaining life for ORC devices in terms of pages, it is also envisioned by the invention that remaining life can be measured by time, or by specific date, depending on the types of use that a system encounters. The "sort files for ORC life remaining" step 314 routine of the present invention will organize the list of ORC devices in terms of the expected remaining life. The ORC device, or consumable, with the shortest estimated life is listed first, the ORC, or consumable, with the second shortest expected life listed second, and so on until all the ORC devices, and consumables, have been listed in terms of their remaining expected life. In this manner, the earliest expiration period is listed first and viewing the first element on the list provides the operator with information related to the ORC, or consumable, that is expected to expire first. An exception to the foregoing discussion related to the list of ORC devices, and consumables, is where an ORC device, or consumable, has just been replaced/replenished or during the first power up of the machine where the "sort files for ORC life remaining" step 314 again must process multiple ORC object files.

Preferably, the system 102 checks the object files for ORC devices, and consumables, that are towards the top of the list as shown in Table 1 after the "sort files for ORC life remaining" step 314 routine is run to verify that the most recent use of the digital printing system 103 has not exceeded the remaining life of that ORC device, or consumable, with the shortest remaining life. The invention envisions using the expected remaining life of the ORC devices, or consumables, that are expected to expire first and use these results in combination with parameters associated with expected use, recent use or typical use of the printing devices to create a list of items to be included in an order statement to stock supplies for an inventory. The inventory can be used to maintain parts for a single printing device or many printing devices. Additionally, the inventory management system of this invention is applicable to any type of serviceable equipment requiring spare parts, or consumables. The "sort files for ORC life remaining" step 314 routine sorts all the ORC devices, and consumables, and sends the list of ORC devices, and consumables, to the GUI 106, which allows the operator to view the life expectancies of the various ORC devices. It should be understood that variations of the above discussed sort routine will be readily apparent to those skilled in the relevant art. There are numerous sort routines known within the art that will provide the necessary functionality required by the present invention.

"Determine remaining life" step 315 takes the remaining life values from the object file for each of the ORC devices, and consumables, and decrements the remaining life value for each of the ORC devices, or consumables, by the number of pages that have been printed since the last time "determine remaining life" step 315 has been run. A determination is made if any of the ORC devices, or consumables, life time has expired. In the preferred embodiment, a printed sheet would typically be an A4 page, and a sheet that is 11 inches by 17 inches would result in decrementing the remaining life of the ORC device, and consumables, by two pages. Therefore, the remaining life values in the object files for each of the ORC devices are decremented by "1" for each A4 sheet that is printed and by "2" for each 11 inch by 17 inch sheet that is printed. Duplex pages would typically be counted twice as much as a single sided page in determining the remaining life of the ORC devices. The parameters used to determine the remaining life of the ORC devices, and consumables, can also be related to color. Sheets that require substantial amounts of color or large amounts of particular colors can have individual parameters indicative of the usage of large amounts of that color or colors.

If the result of "determine remaining life" step 315 indicates that an ORC, or consumable, has reached the end of its life time, then "send reminder interval" step 317 accesses the object file for that object as previously discussed, and sets up the interval with which the operator will be reminded that the expected life span for that ORC, or consumable, has expired. Once "determine remaining life" step 315 makes a determination that one of the ORC devices, or a consumable item, has reached its expected life time, the preferred embodiment has "send ORC expired message" step 318 provide the operator with a notification that an ORC, or consumable, has expired by alerting the operator via GUI 106. It will be readily understood to those skilled in the art, that there are numerous means for notification. The alert can be communicated by any alarm mechanism. The alert can also be communicated via a user interface that is not a graphical user interface.

If "determine remaining life" step 315 indicates that none of the ORC devices, or consumables, have reached their expected life time, "wait for time period" step 316 provides a function that will allow a predetermined parameter to expire before branching back to "determining remaining life" step 315. In the preferred embodiment, "wait for time period" step 316 will provide a timer that is set to wait a predetermined period of time before branching back to "determine remaining life" step 315. The time period set by "wait for time period" step 316 in the preferred embodiment is set to match the remaining life of the ORC device, or consumable, with the lowest expected life time. Other parameters can be used instead of time periods, such as number of sheets, by "wait for time period" step 316, and the use of other parameters is specifically envisioned by the present invention. Among these different parameters are time periods other than the remaining life of an ORC device, such as a specific number of sheets that have been printed (or possibly every sheet) instead of, or in combination with time periods related to the remaining life of an ORC, or consumable. Additionally, specific time periods can be used to establish the time period used by "wait for time period" step 316.

After the parameter used by "wait for time period" step 316 has expired, "determine remaining life" step 315 will again access the remaining life values from the object files for the ORC devices, and consumables, and decrement the remaining life value for each of the ORC devices, and consumables, by the number of pages that have been printed since the last time "determine remaining life" step 315 has been run, as previously stated.

The apparatus 103 (particularly the NexPress™ 2100) uses the concept of ORC devices to reduce overall per page print cost and maximize print quality and uptime at the customer site. The ORC devices within the printing apparatus associated with the inventory management system of the present invention, are components within the printer that are designed to be replaced by the printer operator without requiring the services of a more highly skilled field engineer. In order for ORC devices to achieve the goal of reducing per page print costs, it is necessary to know when the "optimal" life of an ORC device has been reached. Here "optimal" is used to describe the point after which further printer use with the ORC device that has reached its optimal life will potentially either adversely affect print quality or fail. It is important in any printing system to understand the variables that result in print quality. It is extremely important in systems involving high-end digital printers, that the variables affecting print quality are well known. Additionally, the operators for these printing systems need to be aware of the state of the variables that can affect print quality. The inventory management system of the present invention addresses these needs by providing a real time update of the expected life span for ORC devices upon demand as well as notification of a situation where the expected life span of an ORC device is about to expire, or in fact already has expired. The specific timing of this notification also needs to be as accurate as possible, especially in high-end digital printing systems, because of the high volume of prints that are made. This is to insure maximum component life is not exceeded, which in turn results in minimizing the per page print cost for that printer and maximizing print quality.

Actual life of a specific ORC, or consumable, in a specific printer is dependent on many factors. Among these factors are the number of pages printed, the size of the pages, printing on one side (simplex) versus both sides (duplex) of the paper, the type of finish, the characteristics of the paper, the environment in which the printer resides (room temperature, air quality, dust contaminants), the number of times the printer is shut down and restarted, and the manufacturing quality of the ORC devices and consumables. While it is not practical for the system to immediately characterize all of the variables that affect the life of an ORC device or consumable, it is possible to provide systems that can characterize these variables that have a determining factor in the life of a specific ORC device and a specific consumable. The present invention envisions predicting the life times of ORC devices accurately by taking into account the past history of the same or similar ORC devices.

To achieve the goal of predicting the life of an ORC device, or consumable, as accurately as possible, the inventory management system of the present invention provides ORC tracking system software that can perform these important tasks. Once a specific ORC device has expired, a replacement for that specific ORC device is placed into the system. The system software then takes the life information for the expired ORC device, or consumable, and places it into a history file for that ORC device, or consumable. In the preferred embodiment, this history file would be retained in the object file as previously discussed. When that specific ORC device, or consumable, is replaced again, the additional history information is added to this list so that life history for each specific ORC device, or consumable, can be retrieved and used for calculation. After an ORC device, or consumable, is replaced, the system software calculates a new life expectancy based on the life spans of the previous ORC devices, or consumables. The new life expectancy then becomes the expected life span for the ORC device, or consumable.

For an unweighted average of N histories for a specific ORC, or consumable, this would be calculated using the formulas shown in Equations 1a and 1b to arrive at the total history and the new life calculations, which are a generalization of unweighted average calculation for N ORCs.

$$\text{Total\_History} = \text{history}_N + \text{history}_{N-1} + \text{history}_{N-2} + \text{history}_{N-3} \ldots \text{history}_1 \qquad \text{Equation 1a}$$

$$\text{new\_life} = \text{Total\_History}/N \qquad \text{Equation 1b}$$

In the preferred embodiment, the ORC device tracking system typically employs default values for life expectancy of the ORC devices. The historical data derived from previously used ORC devices is employed, by the preferred embodiment, after there have been sufficient numbers of ORC devices of a specific type replaced. The object files for each of the ORC devices keeps a record of the number of times a specific ORC device has been replaced, as well as the average life of an ORC device. Using a replacement history for a specific ORC device that equals 10 replacements, Equations 2a and 2b illustrate the total history and the new life calculations.

Calculation of unweighted Average of 10 ORCs, or consumables, $$Total\_History = history_{10} + history_9 + history_8 + history_7 + history_6 + history_5 + history_4 + history_3 + history_2 + history_1 \quad \text{Equation 2a}$$

$$new\_life = Total\_History/10 \quad \text{Equation 2b}$$

A number of variations for calculating the predicted life have been used, including weighted averages and averages that take into account fewer replacement histories. The present invention envisions using historical data to predict component replacement by employing a relatively simple mathematical formula.

By calculating a new life based on replacement history, the system software can adapt to changes in variables that effect print quality such as printer usage and printer environment. The system software can then reflect the impact of these variable changes in the predicted life of the ORCs, and consumables. Once in place with the ability to adapt the predicted life of the ORCs and consumables to variable changes, the system software can personalize the predicted life of an ORC, or consumable, on a per printer basis dynamically as ORCs and consumables are replaced, and account for all the factors that influence life of ORCs, and consumables, by using historical life data. By accounting for the variable influences on ORC or consumable life, the system achieves the goal of optimizing predicted ORC component life on a per printer basis, minimizing per page print costs while maximizing print quality.

Another embodiment of the invention employs a weighted average that incorporates a predefined "default life" for initial part replacement until a suitable number of replacement histories have been made in order to provide an "interim" accurate average. As an example, take 10 histories as a sample of the preferred number of histories to use to determine future life, if there is less than 10 histories, a weighted average based on the number of histories available (up to 10) divided by 10 (which equals a number between 0.0 and 1.0, where 1.0 is the result if there are at least 10 histories, and 0.0 if no replacement histories) multiplied by the average of the histories, and the inverse of this number multiplied by the "default life", and the two numbers then added together to calculate predicted life. The Calculation of weighted Average of less than 10 ORCs and consumables, and a "Default Life" is shown by Equations 3a, 3b and 3c.

$$Ratio = Total\ History(up\ to\ 10) divided\ by\ 10.0 \quad \text{Equation 3a}$$

$$InverseRatio = 1.0 - Ratio \quad \text{Equation 3b}$$

$$Predicted\_Life = new\_life(from\ Equation\ 2)*Ratio + default\_life*InverseRatio \quad \text{Equation 3c}$$

It should also be noted, that the predicted life can be determined without using any default value. One such manner of doing this would be to allow the first ORC device, or initial supply of a consumable, to expire, and then use the life of that first ORC device, or consumable, as the replacement history. Once the replacement history is initiated, the operator could use the replacement history as the expected life of the ORC device, or consumable. The replacement history could then be updated as future ORC devices are used, or consumables replenished. It should be readily understood that numerous weighted averages can be employed to determine the predicted life of an ORC device, or supply of a consumable.

Figure 4:
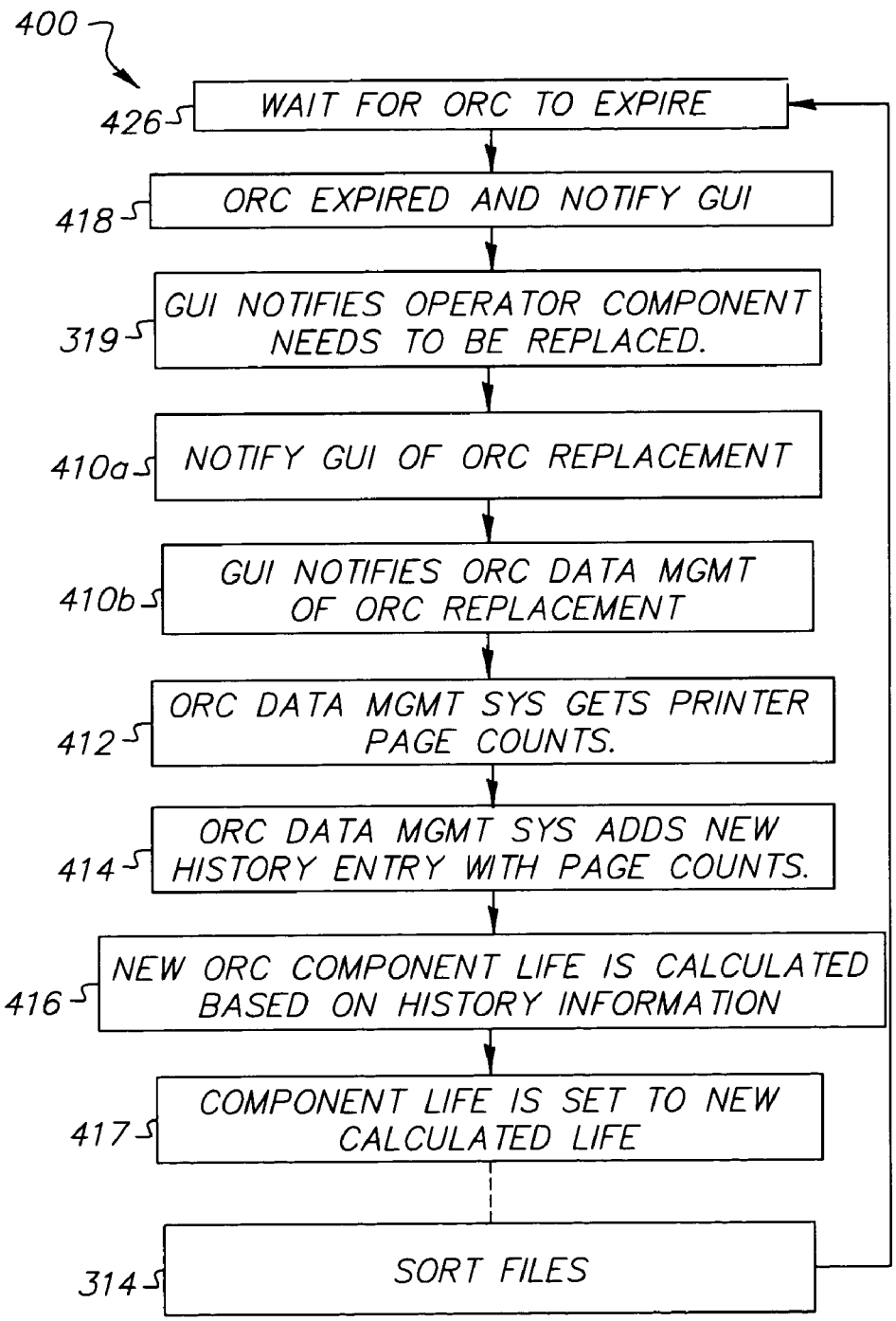
FIG. 4 is a flowchart that details the operations that are performed by the inventory management system of the present invention.

FIG. 4 is a flowchart showing the operation of the inventory management system of the present invention employing the ORC tracking system 300 previously described, used in combination with history data used to predict the life span for ORCs, and consumables. Series of events 400 determines the predicted life span using ORC history data as a combination of what has previously been discussed for the flowchart shown in FIG. 3 together with the portion that employs ORC data to generate ORC device, and consumable, life expectancy. The series of events from FIG. 3 are present in FIG. 4 in a more high level form for the sake of brevity. "Wait for ORC to expire" step 426 is essentially equivalent to the series of steps from the flowchart in FIG. 3, "determine remaining life" step 315 and "wait for time period" step 316. Once an ORC, or consumable, expires (as previously discussed), the inventory management system will then perform "ORC expired and notify GUI" step 418, which is similar to the combination of "send reminder interval" step 317 and "send ORC expired message" step 318 of FIG. 3. "ORC expired and notify GUI" step 418 will alert the printer operator that the expected life time of an ORC, or consumable, has expired and that the ORC, or consumable, needs to be replaced. "Notify GUI of ORC replacement" step 410a is where the operator inputs to the user interface (the GUI 106) that the expired ORC, or consumable, has been replaced and "GUI notifies ORC data management of ORC replacement" step 410b informs the ORC database manager that a new ORC, or consumable, has been installed in place of the ORC, or consumable, that expired. "ORC data management system gets printer page counts" step 412 updates the ORC database manager with any page counts from recent use of the digital printing apparatus 103 that have not yet been accounted for by the system 102. "ORC data management system adds new history entry with page counts" step 414 takes the page counts from "ORC data management system gets printer page counts" step 412 and updates the ORC database manager. "New ORC component life is calculated based on history information" step 416 takes the updated ORC database manager information and computes a new life expectancy for the ORC, or consumable, that has just been replaced using the equations that have previously been discussed. "Component life is set to new calculated life" step 417 takes the computed life and applies it to the ORC, or consumable, that has just been replaced. The system of the preferred embodiment then branches back to "wait for ORC to expire" step 426 because the preferred embodiment of the present invention has different computational elements performing the flowcharts shown in FIG. 3 and FIG. 4. The flowchart in FIG. 4 is performed by the computational elements in the NexStation® 104, and the "sort files for ORC life remaining" step 314 routine of FIG. 3 is performed by the DFE in the digital printing apparatus 103.

In apparatus having only one computational element, or using only one computational element to perform both the flow charts shown in FIG. 3 and FIG. 4, then "sort files for ORC life remaining" step 314 would be run after "component life is set to new calculated life" step 417, as shown by the dotted line in FIG. 4. Here, the object files for the ORC devices would again be looked at to determine which ORC, or consumable, has the shortest life expectancy. As previously detailed in the discussion related to FIG. 3, there are numerous ways that the ORC, and consumable, object files can be sorted, and numerous ways that time periods can be set. It will be readily apparent to those skilled in the art, that there are alternatives to using the ORC, or consumable, with the shortest life from which to calculate parameters. Numerous thresholds can be applied as parameters. Multiple thresholds can operate simultaneously for different ORC devices, and consumable items, to alert the operator when life expectancies are running short.

Figure 5:
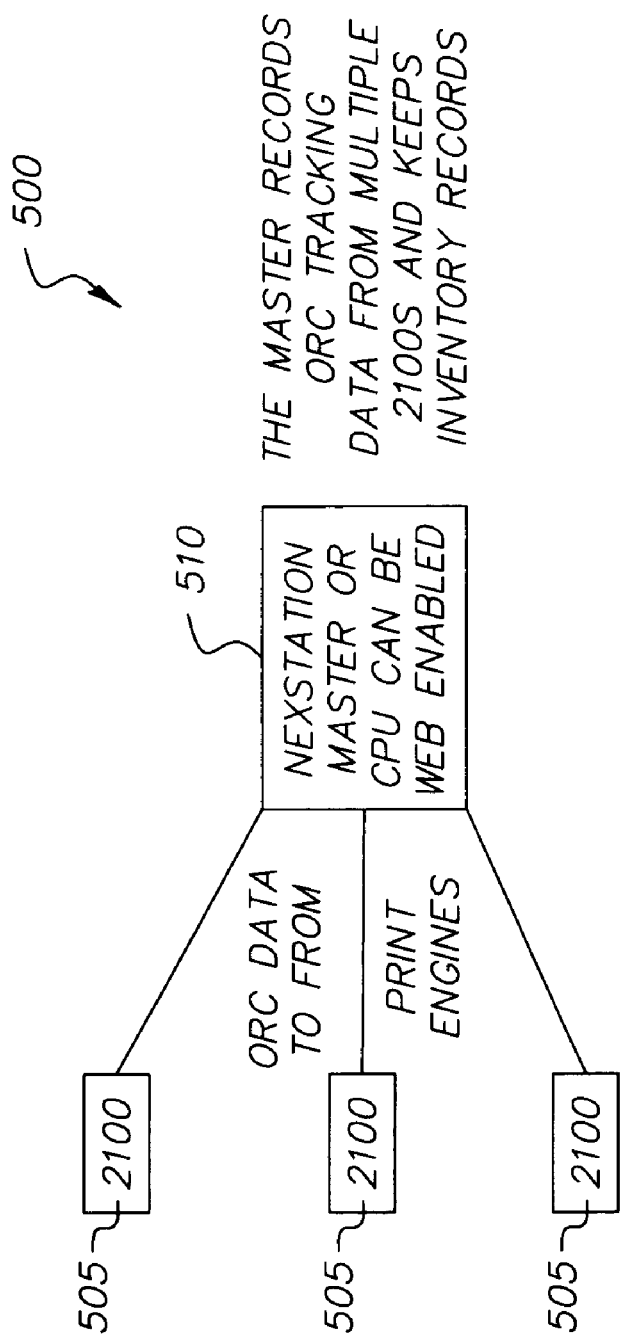
FIG. 5 is a block diagram illustrating the pieces of equipment used in the preferred embodiment of the inventory management system of the invention.

The inventory management system of the invention, designated by the numeral 500 in FIG. 5, details and records expected remaining life information for ORCs, and consumables, by recording the use, and the types of use, for the ORCs. The preferred embodiment of the present invention, as seen in FIG. 5, employs printing apparatus 505 that contain tracking features for serviceable components and consumables. The printing apparatus 505 relate tracking information to an inventory management system master 510. The inventory management system master 510 is responsible for managing the inventory of replaceable components and consumables for the printing apparatus 505. The preferred embodiment of the invention employs as printing apparatus 505 at least one NexPress™ 2100 having an online ORC device and consumables life tracking system that is used in conjunction with the inventory management system 500.

The ORC device and consumables life tracking system enables an operator to manage the inventory of the ORC devices and consumables and, furthermore, enables replacement of the ORC devices and consumables within a time frame that optimizes machine performance as well as the uptime of the machine. The inventory management system 500 can also be configured so that the ORC and consumables life tracking system for each of several NexPress™ 2100 machines can have a single inventory management system 500, generally referred to herein as the master 510. The operator of the master 510 can then manage the inventory of ORC devices and consumables for several NexPress™ 2100 machines using a single inventory. The preferred embodiment of the inventory management system of the invention provides for the automated decrementing of a specific ORC device or consumable within the inventory upon usage of that specific ORC device or consumable.

Still referring to FIG. 5, the present inventory management system of the invention has two basic models of tracking inventory for ORC devices and consumables. The first model uses the capabilities of the user interface (GUI 106) for each of the NexPress™ 2100 printing apparatus 505 to provide for the inventory tracking. In this first model, the ORC devices and consumables are placed into NexPress™ 2100 printing apparatus 505 by the printer operator, the printer operator then identifies the replacement of that ORC device or consumable to the inventory management system 500 by making an entry using the GUI 106 to that printing apparatus 505. The interface between the print apparatus 505 and the master 510 of the inventory management system 500 receives the entry that was made locally at the printing apparatus 505 and enters the consumption data to the inventory database. The master 510 takes local entries from the printing apparatus 505 and places it into the inventory, which is globally maintained for all pieces of equipment in the inventory management system 500. The globally maintained inventory then removes the replaced ORC device or consumable from the inventory. Locally, the NexPress™ 2100 printing apparatus 505 will allow the printer operator to view information relating to the remaining life, replacement history and average expected life of the ORC devices and consumables after an ORC device or consumable has been replaced as previously discussed. Additionally, the interface between the master 510 and the NexPress™ 2100 printing apparatus 505 will allow the printer operator to view information relating to the entire inventory. Globally, the inventory management system 500 tracks inventory consumption directly through the communication interface between the master 510 to inventory management system 500 and all NexPress™ 2100 printing apparatus 505 sharing the inventory.

In the second model, the inventory master 510 controls the updating of the inventory directly from the master 510. The second model would be preferable where, for example, a vault is used to store the inventory for the ORC devices. Each time an ORC device or consumable within a NexPress™ 2100 printing apparatus 505 is to be replaced, the replacement part would have to be retrieved from the inventory, which is stored in the vault. The inventory master 510 would typically have a location that is associated with the vault, or even located at the vault. In the second model, the operator of the inventory master 510 would be responsible for the management of the inventory and the printer operator for the printing apparatus 505 would only respond to messages that are generated locally from the NexPress™ 2100 printing apparatus 505 to replace any given ORC device or consumable. Therefore, the operator of the inventory master 510 would be responsible for entering data relative to the inventory and there is no need for inventory usage to be entered separately by the operator of the NexPress™ 2100 that is actually receiving the ORC device or consumable that is being removed from inventory.

It is provided by the invention that the inventory management system 500 either provide a flag within the system software, or a mechanical switch to identify whether the first or second model is being employed to manage the inventory. In both models, the printer operator can view inventory information from the master 510. Also, in both models the inventory management system 500 receives ORC and consumables tracking information from all the NexPress™ 2100 printing apparatus 505 sharing the same inventory.

As previously discussed, the ORC and consumables tracking system for each NexPress™ 2100 will determine the correct time to replace ORC devices and consumables, and notify the operator by presentation of an alert box within the GUI 106 requesting them to perform the task. The operator will also acknowledge the completion of the task via the GUI 106. The replacement information regarding ORC devices and consumables, including the ORC and consumable ID (which is typically the inventory catalog number), the quantity replaced, the previous actual replacement life and new predicted average life is transferred to the inventory management system 500. The inventory management system 500 for one or more NexPress™ 2100 printing apparatus 505 can calculate expected life times for ORC devices and consumables in terms of a single NexPress™ 2100 printing apparatus 505 and it's associated use patterns, or in terms of multiple NexPress™ 2100 printing apparatus 505 and their use patterns associated with the entire group of NexPress™ 2100 printing apparatus 505. Alternatively, the group of NexPress™ 2100 printing apparatus 505 can have use patterns arranged into groups of NexPress™ 2100 printing apparatus 505 or be broken into use patterns for individual NexPress™ 2100 printing apparatus 505.

Preferably, the NexPress™ 2100 printing apparatus 505 will transfer daily printer page counts to the inventory management system 500. The inventory management system 500 can then predict inventory needs in accordance with the current use of the NexPress™ 2100 printing apparatus 505 or predict inventory needs based on a number of parameters related to the use of the NexPress™ 2100 printing apparatus 505.

Information regarding the stock within the inventory for each of the ORC devices and consumables is retained by the inventory management system 500 and this inventory data can be transferred to the GUI 106 of a NexPress™ 2100 printing apparatus 505 to allow the operator to view the available stock before performing a replacement. This transfer of inventory data can take place from the inventory master 510 to any slave NexPress™ 2100 printing apparatus 505 that shares the inventory.

The inventory management system 500 within the preferred embodiment is accessible by the operator for any NexPress™ 2100 printing apparatus 505 that shares the inventory simply by using the GUI 106 to the printing apparatus 505. Communication between the application and an external server(s) provides the transactional data needed to process orders. Critical thresholds relative to the remaining life of the ORC devices and consumables can be customized for the inventory management of multiple machines. These thresholds can be used by the inventory database to trigger the automatic creation of an ORC device order sheet accompanied by an operator notification that it is time to replace an ORC device or consumable item that has already been in use for its expected life. The system of the preferred embodiment provides a GUI 106 that allows the printer operator, or some other person in the print shop such as the operator of the inventory master 510, to set reorder levels, generate recommendation reports, pull inventory, receive inventory, examine inventory, order inventory, reorder inventory, log activities, configure inventory, and modify the inventory for ORC devices and consumables. The inventory management system 500 of the invention thus enables a print shop to manage inventory by placing orders, creating order forms, writing reports related to machine usage and generally, maintain the inventory. Table 2 below illustrates a typical ORC and consumables inventory listing, as it would be displayed on a GUI 106 for a NexPress™ 2100 printing apparatus 505.

TABLE 2

| ORC Catalog Number | ORC Description | Average Life | Quantity on Hand | Suggested Quantity On Hand | ORC Reorder Point |
|---|---|---|---|---|---|
|  | General Press Maintenance | 50,000 | 0 | 2 | 1 |
|  | Perfector Belt Maintenance | 200,000 | 0 | 2 | 1 |
| 21001 | NexPress ™ DryInk ®, Cyan | 25,000 | 0 | 8 | 2 |
| 21002 | NexPress ™ DryInk ®, Magenta | 25,000 | 0 | 8 | 2 |
| 21003 | NexPress ™ DryInk ®, Yellow | 25,000 | 0 | 8 | 2 |
| 21004 | NexPress ™ DryInk ®, Black | 12,500 | 0 | 16 | 4 |
| 21017 | Developer, Cyan | 300,000 | 0 | 200 | 40 |
| 21018 | Developer, Magenta | 300,000 | 0 | 200 | 40 |
| 21019 | Developer, Yellow | 300,000 | 0 | 200 | 40 |
| 21020 | Developer, Black | 300,000 | 0 | 200 | 40 |
| 21025 | Fuser Roller | 150,000 | 0 | 5 | 1 |
| 21026 | Contact Skive Finger | 45,000 | 0 | 2 | 1 |
| 21027 | Pressure Roller | 200,000 | 0 | 2 | 1 |
| 21029 | Donor Roller | 375,000 | 0 | 2 | 1 |
| 21030 | Fuser Fluid | 100,000 | 0 | 2 | 1 |
| 21031 | Fuser Cleaning Web | 100,000 | 0 | 200 | 40 |
| 21032 | Transport Web | 100,000 | 0 | 2 | 1 |
| 21033 | Imaging Cylinder Cleaner | 4,000,000 | 0 | 2 | 1 |
| 21034 | BC Cleaning | 4,000,000 | 0 | 2 | 1 |
| 21035 | IC/BC Cleaning Brush | 2,200,000 | 0 | 2 | 1 |
| 21036 | IC/BC Cleaning Blade | 200,000 | 0 | 8 | 2 |
| 21037 | Cleaner Sump | 550,000 | 0 | 2 | 1 |
| 21038 | Cleaning Web | 550,000 | 0 | 2 | 1 |
| 21039 | Imaging Cylinder | 230,000 | 0 | 2 | 1 |
| 21040 | Blanket Cylinder | 330,000 | 0 | 2 | 1 |
| 21041 | Primary/PreClean Wire | 200,000 | 0 | 2 | 1 |

TABLE 2-continued

| ORC Catalog Number | ORC Description | Average Life | Quantity on Hand | Suggested Quantity On Hand | ORC Reorder Point |
|---|---|---|---|---|---|
| 21042 | Conditioner/Tackdown Wire | 200,000 | 0 | 11 | 3 |
| 21043 | PreClean Charger | 2,000,000 | 0 | 2 | 1 |
| 21044 | Narrow Primary Grid | 7,000,000 | 0 | 2 | 1 |
| 21045 | Wide Primary Grid | 3,000,000 | 0 | 2 | 1 |
| 21046 | Primary Charger | 2,000,000 | 0 | 2 | 1 |
| 21047 | Conditioning Charger Grid | 1,000,000 | 0 | 2 | 1 |
| 21048 | Tackdown Charger | 2,000,000 | 0 | 2 | 1 |
| 21049 | Conditioning Charger | 14,000,000 | 0 | 2 | 1 |
| 21050 | PreClean Grid | 2,000,000 | 0 | 2 | 1 |
| 21051 | DryInk ® Collection Bottle | 135,000 | 0 | 2 | 1 |
| 21054 | Pressure Roller Cleaner Sheet | 40,000 | 0 | 2 | 1 |
| 21055 | 50 Hz Fuser Lamp | 2,000,000 | 0 | 2 | 1 |
| 21056 | 60 Hz Fuser Lamp | 2,000,000 | 0 | 2 | 1 |
| 21057 | Pressure Roller Lamp | 2,000,000 | 0 | 2 | 1 |
| 21058 | Wiper Pads | 200,000 | 0 | 4 | 1 |
| 21059 | Fuser Pads | 475,000 | 0 | 2 | 1 |
| 21060 | Metering Blade | 475,000 | 0 | 2 | 1 |
| 21061 | Metering Roller | 875,000 | 0 | 2 | 1 |
| 21062 | Fuser Sump | 130,000 | 0 | 2 | 1 |
| 21063 | Cleaner Sump | 125,000 | 0 | 2 | 1 |
| 21064 | Water Filter Cartridge | 500,000 | 0 | 2 | 1 |
| 21074 | BC Charger | 1,800,000 | 0 | 2 | 1 |

In Table 2, the ORC devices are listed in terms of increasing Catalog Numbers. This is a different ordering from Table 1 where the ORC devices and consumables were listed in terms of decreasing remaining life. Table 2 includes, for each of the ORC devices and consumables, columns for: catalog number, description, average life, quantity on hand, suggested quantity and an ORC reorder point. The columns for catalog number, description and average life for the ORC devices are the same as those in Table 1, with a different ordering. The column quantity on hand provides the number of each of the ORC devices and consumables contained in inventory as the present time. The column suggested quantity on hand gives an amount of replacement ORC devices and consumables that is suggested by the inventory management system 500 as being contained in the inventory for each of the ORC devices listed in Table 2. The column ORC reorder point gives the threshold quantity for each of the listed ORC devices and consumables that, once reached, indicates that the ORC device or consumable needs to be reordered to replenish the supply in inventory.

The ORC inventory management system 500 will notify the inventory manager in the event that the inventory threshold for a tracked ORC device or consumable has been reached. It should be understood that the inventory threshold is a different trigger mechanism than the previously discussed trigger mechanism that is activated when an ORC device or consumable reaches its expected life time. The inventory threshold relates to the number of ORC devices and consumables within the inventory compared to a desired amount that the inventory tracking system compares to the actual number of ORC devices and consumables within the inventory. The actual number of any ORC device or consumable contained within the inventory is incremented or decremented when the operator removes a stock item or replenishes a stock item, respectively. The operator can have the inventory management system 500 generate an ORC recommendation report that provides a suggested restocking list for ORC devices and consumables contained within the system. Table 3 below is an example of an ORC Recommendation Report.

TABLE 3

| Catalog Number | Description | Quantity on Hand | Reorder Quantity | Suggested Quantity On Hand | ORC Reorder Point |
|---|---|---|---|---|---|
| | General Press Maintenance | 0 | 2 | 2 | 1 |
| | Perfector Belt Maintenance | 0 | 2 | 2 | 1 |
| 21001 | NexPress ™ DryInk ®, Cyan | 0 | 8 | 8 | 2 |
| 21002 | NexPress ™ DryInk ®, Magenta | 0 | 8 | 8 | 2 |
| 21003 | NexPress ™ DryInk ®, Yellow | 0 | 8 | 8 | 2 |
| 21004 | NexPress ™ DryInk ®, Black | 0 | 16 | 16 | 4 |
| 21017 | Developer, Cyan | 0 | 200 | 200 | 40 |
| 21018 | Developer, Magenta | 0 | 200 | 200 | 40 |
| 21019 | Developer, Yellow | 0 | 200 | 200 | 40 |
| 21020 | Developer, Black | 0 | 200 | 200 | 40 |
| 21025 | Fuser Roller | 0 | 5 | 5 | 1 |
| 21026 | Contact Skive Finger | 0 | 2 | 2 | 1 |
| 21027 | Pressure Roller | 0 | 2 | 2 | 1 |
| 21029 | Donor Roller | 0 | 2 | 2 | 1 |
| 21030 | Fuser Fluid | 0 | 2 | 2 | 1 |
| 21031 | Fuser Cleaning Web | 0 | 200 | 200 | 40 |
| 21032 | Transport Web | 0 | 2 | 2 | 1 |
| 21033 | Imaging Cylinder Cleaner | 0 | 2 | 2 | 1 |
| 21034 | BC Cleaning | 0 | 2 | 2 | 1 |
| 21035 | IC/BC Cleaning Brush | 0 | 2 | 2 | 1 |
| 21036 | IC/BC Cleaning Blade | 0 | 8 | 8 | 2 |
| 21037 | Cleaner Sump | 0 | 2 | 2 | 1 |
| 21038 | Cleaning Web | 0 | 2 | 2 | 1 |
| 21039 | Imaging Cylinder | 0 | 2 | 2 | 1 |
| 21040 | Blanket Cylinder | 0 | 2 | 2 | 1 |
| 21041 | Primary/PreClean Wire | 0 | 2 | 2 | 1 |
| 21042 | Conditioner/Tackdown Wire | 0 | 11 | 11 | 3 |
| 21043 | PreClean Charger | 0 | 2 | 2 | 1 |
| 21044 | Narrow Primary Grid | 0 | 2 | 2 | 1 |
| 21045 | Wide Primary Grid | 0 | 2 | 2 | 1 |
| 21046 | Primary Charger | 0 | 2 | 2 | 1 |
| 21047 | Conditioning Charger Grid | 0 | 2 | 2 | 1 |
| 21048 | Tackdown Charger | 0 | 2 | 2 | 1 |
| 21049 | Conditioning Charger | 0 | 2 | 2 | 1 |
| 21050 | PreClean Grid | 0 | 2 | 2 | 1 |
| 21051 | DryInk ® Collection Bottle | 0 | 2 | 2 | 1 |
| 21054 | Pressure Roller Cleaner Sheet | 0 | 2 | 2 | 1 |
| 21055 | 50 Hz Fuser Lamp | 0 | 2 | 2 | 1 |
| 21056 | 60 Hz Fuser Lamp | 0 | 2 | 2 | 1 |
| 21057 | Pressure Roller Lamp | 0 | 2 | 2 | 1 |
| 21058 | Wiper Pads | 0 | 4 | 4 | 1 |
| 21059 | Fuser Pads | 0 | 2 | 2 | 1 |
| 21060 | Metering Blade | 0 | 2 | 2 | 1 |
| 21061 | Metering Roller | 0 | 2 | 2 | 1 |
| 21062 | Fuser Sump | 0 | 2 | 2 | 1 |
| 21063 | Cleaner Sump | 0 | 2 | 2 | 1 |
| 21064 | Water Filter Cartridge | 0 | 2 | 2 | 1 |
| 21074 | BC Charger | 0 | 2 | 2 | 1 |

The inventory management system of this invention enables the automatic creation of forms to replenish inventory. The inventory management system 500 can create an order form for the ORC devices and consumables, automatically, by tracking the remaining life of each of the ORC devices and consumables in all the printers sharing a single inventory. It is envisioned that the automatic order form can be sent to a channel supplier of the desired consumables as a matter of normal business practice, or that the automatically generated order form can be reviewed by a person responsible for the management of the inventory prior to it being sent to a supplier. It is further provided by the invention, that the order form can be generated at periodic intervals, such as an option of providing an ordering frequency configured for a specific number of shipments per month. The preferred embodiment of an inventory management system 500 informs the operator of the master 510 if an unacceptable ordering frequency has been entered (alternatively, the inventory management system 500 can show only acceptable ordering options). Typically, an ordering frequency could be set too low (too seldom) or too high (too often) based on the printer usage rate, number of printers, and the business rules. Accordingly, the inventory management system 500 can be preset to not accept an ordering frequency that is not within an acceptable range as determined by the usage of the printing apparatus.

The operator responsible for managing the inventory can define specific usage pattern business rules that are appropriate for their printing use. These usage patterns would typically be based on business rules that are provided to more accurately manage the inventory and the generation of orders for parts to stock/replenish the inventory. An example of a business rule specific to a single site, or printer, would be critical high volume jobs are all preformed during the first two weeks of the month. This information would ensure that bimonthly shipments compensate for the uneven usage patterns and ensure that an adequate inventory will be available during peak demand times.

The inventory management system of this invention also provides the capability to maintain the inventory for potentially numerous machines by enabling the operator to track devices that have expected life times that can be predicted in terms of usage of the various machines. Thresholds are employed by the invention to enable the operator charged with the responsibility of inventory management to track the ORC devices and consumables in accordance with their relative usage. The thresholds can change in accordance with consumption level. Multiple thresholds can serve as parameters for a single ORC device or consumable. As previously discussed, the ORC devices and consumables will cycle through their expected life times that have been established until replenishment is required. It is specifically provided that the inventory management system 500 employs the expected life time of the ORC devices and consumables in conjunction with the estimated usage to predict inventory needs. Preferably, thresholds are provided at a critical level as well as a recommended level for replacement of ORC devices and consumables, resulting in the ability to generate order forms that can be based on anticipated requirements to maintain inventory levels for one or many printing apparatus. It is specifically provided that the inventory management system 500 will create order forms that will substantially reduce the number of shipments for ORC devices and consumables that are required. Reducing the number of shipments of ORC devices and consumables required to maintain an inventory results in reduced costs for both the supplier and the customer in terms of costs of shipping and cost associated with filling orders and stocking inventory.

The interface between the inventory management system master 510, and the ORC devices and consumables can be accomplished by various mechanisms including but not limited to internet email, intranet based communication, real time communications between the NexPress™ 2100 and the inventory management system 500, or non-real time communications between the NexPress™ 2100 and the inventory management system 500. The manner by which order forms are communicated to a supplier from the inventory management system 500 can also take place by various communications such as email, internet based communications or paper based order forms.

The parameters employed by the inventory management system 500 of the invention can relate to items such as: life of ORC devices and consumables; time to restock; estimated future print volume computed by printing apparatus 505 or the master 510 allows operator adjustment; and preference of the types of printers that are being employed. It will be readily appreciated that these parameters can be tailored to be values that are averages, maximized best case, or minimized worst case representations of the parameters that are being employed by the printing apparatus. The inventory management system can be tailored in a distributed processing manner such that two or more computational elements within the individual printer apparatus 505 adjust the parameters in accordance with their particular use and report to the inventory management system 500. Additionally, the inventory management system 500 could adjust the parameters that are applied to all printers attached to the inventory management system 500.

The life tracking system for the ORC devices and consumables contained in the NexPress™ 2100 provides the operator with the knowledge of the optimum time to replace the ORC devices or consumables, thus allowing the operator to manage the ORC devices and consumables to maximize the performance and the uptime of the machine. The inventory management system 500 of the preferred embodiment of the invention works in conjunction with the NexPress™ 2100 to provide on-site capability of inventory management by having the ability to view the stock currently within the inventory stock and to predict future inventory stock requirements.

The inventory management system 500 of the invention is linked to the life tracking system for the ORC devices and consumables. This linkage provides a mechanism that operates to decrement entries within the inventory for a specific ORC device or consumable once data is received by the inventory management system 500 that the specific ORC device or consumable has been replaced. There is an additional interrelationship that exists between the ORC device life tracking system and the inventory management system 500, in that the master 510 for the inventory management system 500 can predict future inventory needs from the information that it receives from the life tracking system. The inventory management system 500 can receive information related to ORC devices and consumables from either one or many NexPress™ 2100 printing apparatus by interfacing with the ORC device life tracking system for each of the NexPress™ 2100 apparatus.

The inventory management system 500 of the invention uses business rules to determine inventory needs, the quantities of consumables that need to be reordered and acceptable reordering frequency in accordance with printing apparatus usage. The business rules employed by the preferred embodiment use the concept of consumable life of the components as determined by apparatus usage. It will be readily appreciated that other types of business rules could be used within an inventory management system 500 such as time rather than system usage. The NexPress™ 2100 printing apparatus could employ an inventory management system 500 that predicts inventory requirements based on recent usage and automatically orders inventory within specific time periods. The inventory management system 500 of the preferred embodiment determines inventory needs based on a remaining page life of the ORC devices and consumables in relation to printing apparatus usage in order to project the quantity of each of the ORC devices and consumables that need to be reordered. The remaining life of the ORC devices and consumables provides additional parameters to traditional apparatus usage concepts that are not available within prior art inventory management systems that specify only units or time as the principle projection criteria.

The inventory page life is a dynamic variable that can change with different types of use or with different conditions of use. Therefore, over time, the page life of any specific ORC device or consumable can change in accordance with past usage and actual life of that specific ORC device or consumable. These changes can pertain to a specific printer site, or to an ORC device or consumable where the expected life data changed from previous versions of that specific ORC device or consumable.

Each time an ORC or consumable type of inventory item is taken out of stock and replaced in a machine, a new page life for that ORC device or consumable is computed. This new page life can be based on variables related to a specific printer, a specific printing site having numerous printers, past experienced life for that actual ORC device or consumable or various combinations of these parameters. Other parameters will be readily apparent to those skilled in the art. The inventory management system 500 can employ daily printer page counts in it's business rules to more accurately predict future usage of ORC devices and consumables in general to appropriately fill the inventory needs.

The parameter of a daily printer page count affects usage across all ORC devices and consumables. Inventory management systems that use consumption over a period of time as the parameter by which consumables or replaceable components need to be replaced provide no mechanism to effectively speed up or slow down time based predictions. Furthermore, systems having sensor based alarm mechanisms are not useful for the numerous types of ORC devices that are tracked by the inventory management system of the present invention. The daily page counts that are applied by the invention can effectively speed up or slow down the predicted consumption of all ORC devices and consumables. Time based consumption does not readily allow modification according to use. The daily printer page counts employed by the invention can be from multiple printers at one site as well as a single individual printer. It will be readily apparent that other time periods can be used in place of daily page counts, such as weekly page counts or virtually any time period that appears suitable to the user of the inventory management system 500 of the invention.

The user interface (which in the preferred embodiment is GUI 106) enables entry into the inventory management system 500 of information to signify that a replacement of a serviceable part has been accomplished to replenish the inventory. The inventory management system 500 of the invention could also have the system updated by numerous other methods. One such method would be to provide a bar code on each of the serviceable components and an apparatus that would scan a bar code. The bar code would be entered into the system and provide for tracking of the component throughout it's life time. Other forms of detectable indicia are also suitable for use with the invention. The potential range of detectable indicia can vary from human readable indicators to indicia that can only be read by a machine. Various types of machine readable indicia could include indicia that can be optically scanned, or indicia that can be magnetically read to log inventory of the serviceable components. Numerous other types of human and machine readable indicia will be readily apparent to those skilled in the art such as combinations of letters and numbers.

FIG. 6 is an illustration of the screen that is presented on the GUI 106 for replacement part details of a specific ORC within inventory. The ORC inventory part details screen 600 shown in FIG. 6 is displayed once the operator for the NexPress™ 2100 printing apparatus 505, or the inventory master 510, selects this function from the GUI 106. The ORC inventory part details screen 600 shows similar information to that shown in Table 2 for the same catalog (ORC) number. There are three buttons, "adjust ORC qty" 725, "receive ORC" 750, and "set ORC levels" 775, at the top of the ORC inventory part details screen 600 that can be selected by the operator to allow one of several actions to be taken in relation to the management of inventory for this part.

Figure 7A:
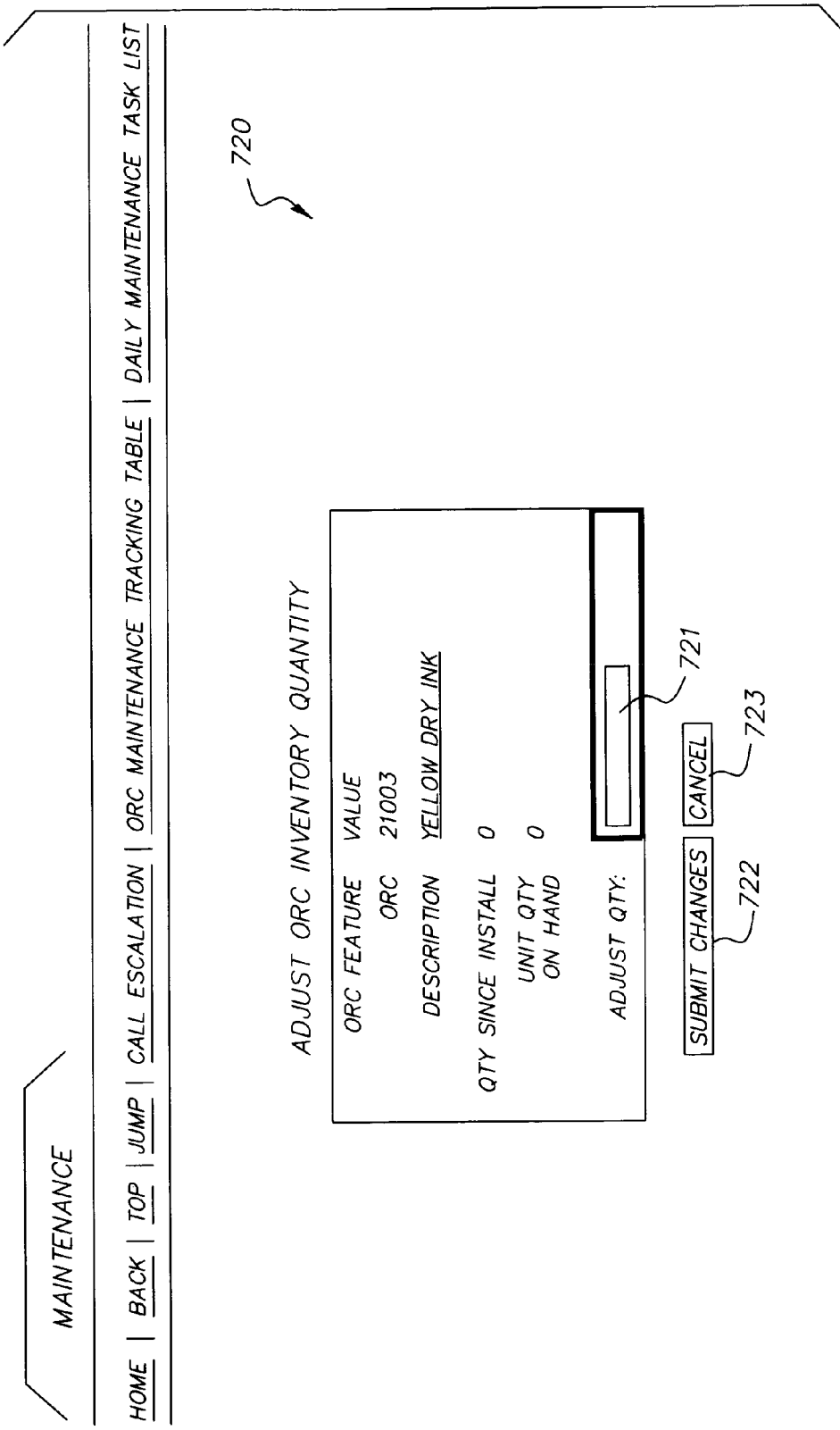
FIG. 7A is an illustration of a screen that is presented for adjusting the inventory quantity for a specific ORC.

Referring to FIG. 7A, "adjust ORC inventory quantity" screen 720 is displayed after the operator selects the "adjust ORC qty" button 725 that is shown on the ORC inventory part details screen 600 in FIG. 6. The "adjust ORC inventory quantity" screen 720 will enable the operator to alter the present number that exists within the inventory for the particular ORC, in this case Yellow DryInk®. There is an "adjust qty" field 721 that enables the quantity for that particular ORC to be adjusted to be entered into the inventory. Once a number is placed into the "adjust qty" field 721 and the operator selects the submit changes button 722, the quantity in the "adjust qty" field 721 becomes the total amount in the inventory for that particular ORC device. The previously existing amount in inventory for that ORC device is then erased. If for any reason the operator decides that the current "adjust ORC inventory quantity" screen 720 is not correct, the operator can press "cancel" button 723 to abort the current operation.

Figure 7B:
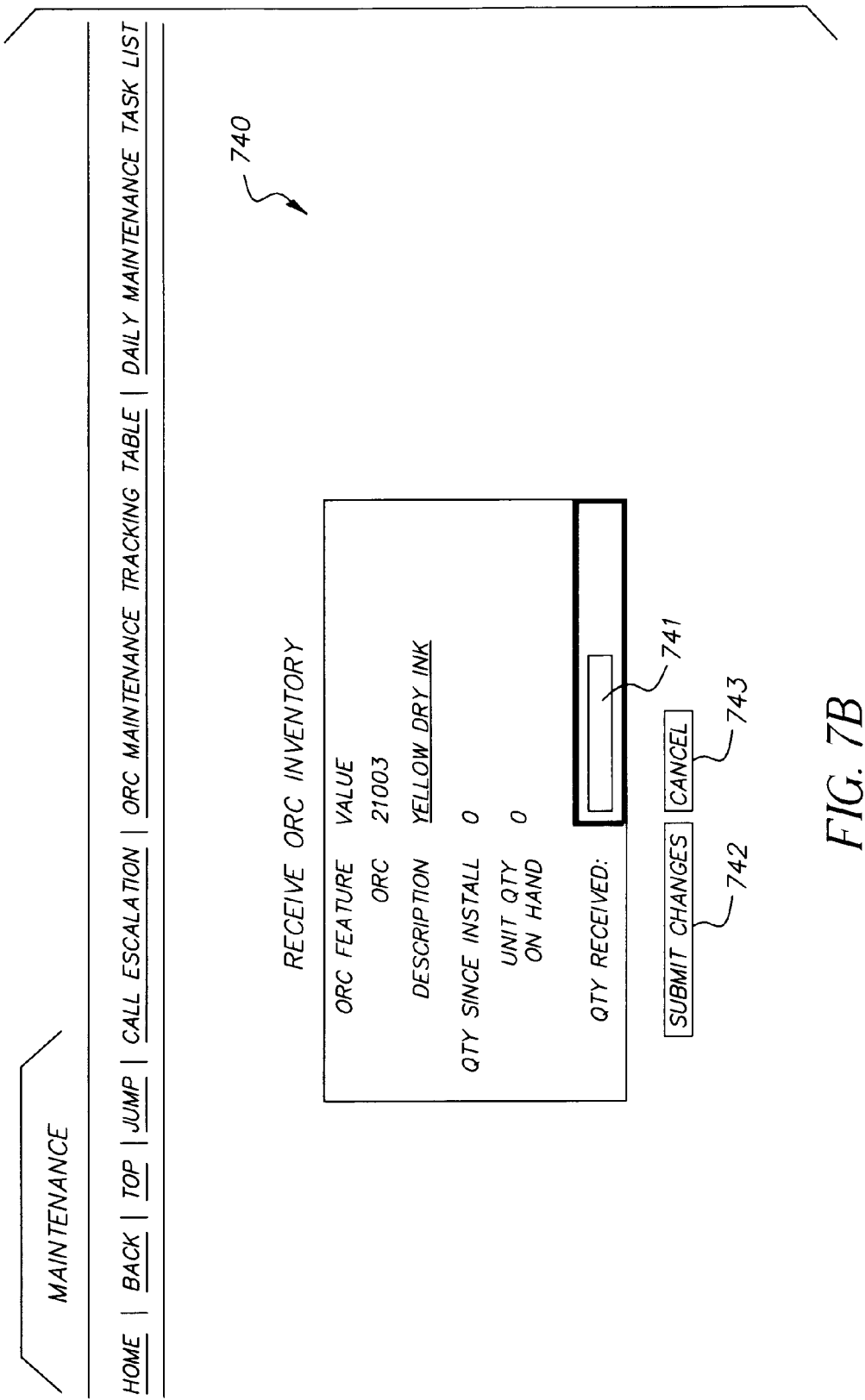
FIG. 7B is an illustration of a screen that is presented for adjusting details for a specific ORC within inventory once that ORC has been received and has to be entered into inventory.

Referring to FIG. 7B, which is an illustration of the "receive ORC inventory" screen 740 that is presented for adjusting details for a specific ORC within inventory once that ORC has been received and has to be entered into inventory, "receive ORC inventory" screen 740 is displayed after the operator selects the "receive ORC" button 750 shown on the ORC inventory part details screen 600 in FIG. 6. "Receive ORC inventory" screen 740 enables the operator to enter received stock items into the inventory database by placing the number of that newly received ORC device into the "qty received" field 741. Once a number is placed into the "qty received" field 741 and the operator selects the "submit changes" button 742, the quantity in the "qty received" field 741 is added to the existing amount currently in inventory for that ORC device. If for any reason the operator decides that the current "receive ORC inventory" screen 740 is not correct, the operator can press "cancel" button 743 to abort the current operation.

Figure 7C:
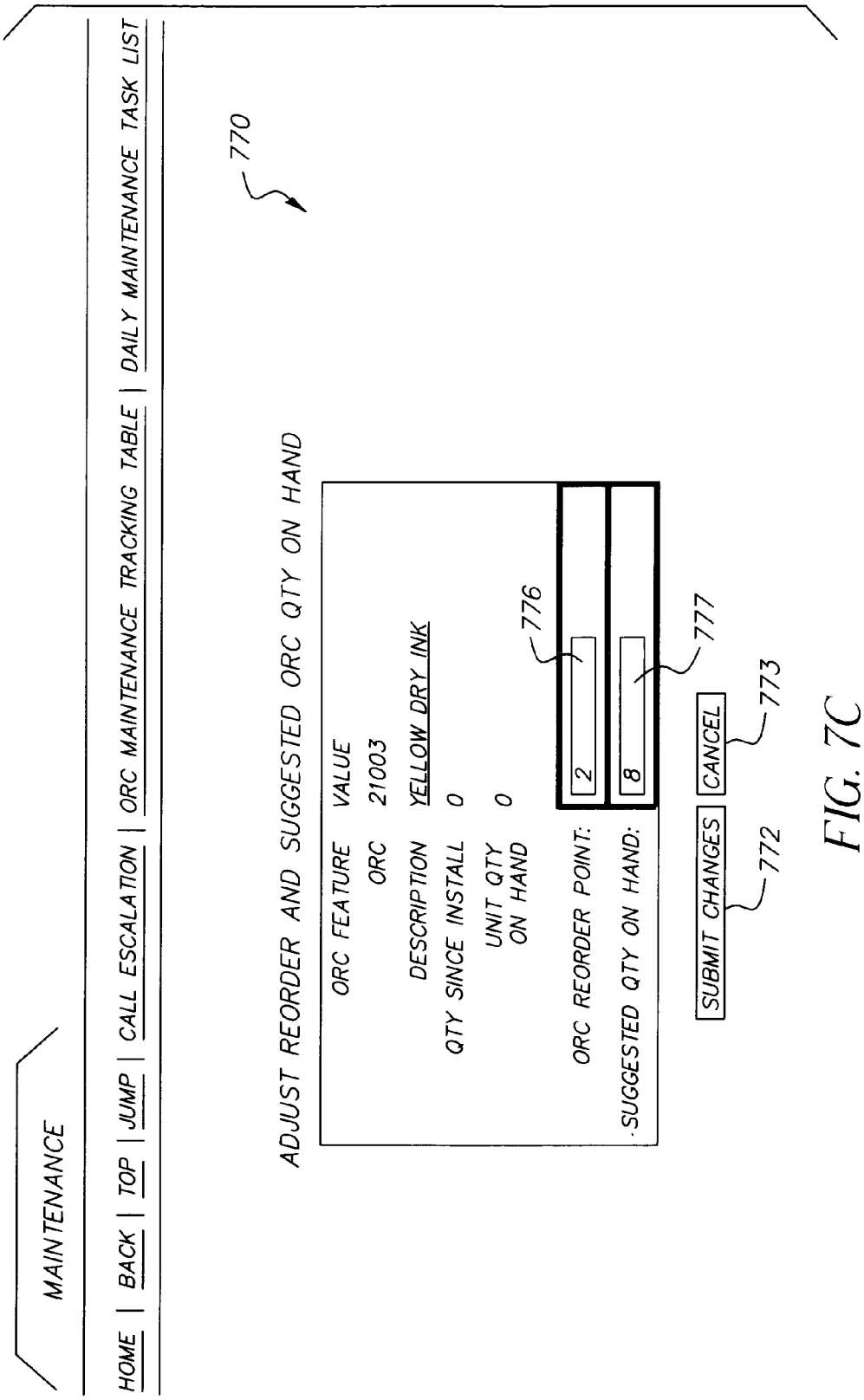
FIG. 7C is an illustration of a screen that is presented for adjusting the reorder details for a specific ORC within inventory.

FIG. 7C is an illustration of the "adjust reorder and suggested ORC qty on hand" screen 770 that is presented for adjusting the reorder details for a specific ORC within inventory that is initiated by the operator selecting the "set ORC levels" button 775 shown on the "ORC inventory part details" screen 600 in FIG. 6. The "adjust reorder and suggested ORC qty on hand" screen 770 is used to adjust the thresholds for a specific ORC device (Yellow DryInk® in this case) that the inventory management system 500 uses. "ORC reorder point" field 776 is a field where the operator can input the number of specific ORC devices that the inventory management system 500 will use to alert the operator that the stock within the inventory for that specific ORC device is dangerously low. "Suggested qty on hand" field 777 is a field where the operator can input the quantity of a specific ORC device that is desired to be retained within the inventory at any given time. Once the operator is satisfied that the quantities entered into the fields are correct, "submit changes" button 772 is pressed and the thresholds that the inventory management system 500 uses for that specific ORC device is updated. If the operator for any reason feels that the "adjust reorder and suggested ORC qty on hand" screen 770 is not the correct screen, initiation of the "cancel" button 773 will return operation to the previous screen settings.

FIG. 8 is an illustration of the "calculate ORC reorder levels" screen 800 that is presented upon selection from the GUI 106. The "calculate ORC reorder levels" screen 800 is used by the inventory management system 500 for setting parameters used to calculate levels at which ORC devices are reordered. "Average monthly print volume" field 810 is a field where the operator can adjust the number of prints that the system is estimated to make on a monthly basis. The monthly print volume is important in estimating the overall ORC device usage that will occur on a monthly basis and the "average monthly print volume" field 810 can be adjusted with varying usage patterns of the printing apparatus. "Work days per month" field 820 is a field that represents the total number of days that the printing apparatus is going to be operating. "Orders per month" field 830 is a field that contains the number of times in a month that the inventory will be ordered and restocked. The "days to fulfill order" field 840 contains the estimated time to receive stock after it has been ordered. "Safety factor" field 850 is a field that represents a summation of the previously discussed fields in the "calculate ORC reorder levels" screen 800. The value in the "safety factor" field 850 is a measure of assurance that replacement parts will be received within a time frame that will ensure that the printing apparatus will not suffer any down time. The higher the "safety factor" field 850 value, the greater the assurance that there is sufficient stock within the inventory on hand to ensure that replacement parts will be received without the printing apparatus 505 suffering any downtime. The operator can input a desired "safety factor" field 850 value and the inventory management system 500 will take the desired "safety factor" field 850 value into account when order forms for replacement parts are generated. The higher the safety factor that is entered, the greater the number of replacement parts that will be placed on the order sheet. "Recalculate" button 860 is a graphical button that an operator can select to initiate the recalculation of the automatic order sheet. The automatic order sheet provided by the inventory management system of the invention is similar to the ORC recommendation report shown in Table 3. By selecting the "recalculate" button 860, the operator takes all the values that have been entered into the fields within the "calculate ORC reorder levels" screen 800, and generates an order sheet in accordance with those values.

The inventory management system 500 of the invention is extensible from 1 machine having serviceable components to any number, N, machines maintaining the relationship, whereby, a single inventory is associated with all the machines. The invention associates a single inventory with virtually any number, N, of machines by employing the previously described parameters to manage this single inventory for all the machines employing ORC devices.

The inventory management system of the invention assumes that current business models require that inventory management system 500 be operated in such a manner as to have on hand replacement parts for each item that is considered a serviceable component within digital printing apparatus 103. The methodology of the present invention centers around the basic principle of reducing the number of shipments required to stock components within the inventory for serviceable equipment. This methodology can be employed from supplier to user (business to customer) as well as from supplier to supplier (business to business) for serviceable equipment.

The objectives of the inventory management system of the invention are to place orders that will address inventory needs by creating order forms that take into account current needs and anticipated needs within some future time frame. There are numerous factors possible to anticipate the stock of items that are desirable for an inventory. Among these factors are the expected life remaining for the items that are maintained in the inventory. Criteria used to determine expected remaining life and expected future use can vary and may include many parameters or a single parameter. One parameter that can be used to determine usage rate is the number of pages printed and an anticipated number of printed pages remaining before any particular item is exhausted. A number related to the clock time hours for which the equipment is used and the remaining number of clock hours before items are exhausted can serve as parameters. The number of power on hours remaining before items are exhausted and resulting future needs can serve as parameters for criteria. Additionally, a number of hours related to specific component processing pages that remain before any item is exhausted and the further needs related to specific component processing. The types of printing to which the equipment is employed can change the remaining expected life for ORC devices as well as consumables and, accordingly, the types of use to which the equipment is applied will serve as a parameter to determine current and future needs of serviceable items that are maintained in the inventory. The inventory management system 500 of the present invention will employ the foregoing parameters as desired by the user/operator of the equipment to generate orders. Thresholds for any of the parameters can be changed and orders generated for both critical and recommended replenishment levels for the items stocked within the inventory. By submitting the recommended order, the owner/operator (customer) is insured that sufficient inventory will always be in stock, thereby preventing equipment downtime. The costs associated with maintaining the inventory, both for the supplier and for the customer, are greatly reduced by making fewer shipments. The customer, in addition to being assured of having a properly stocked inventory, saves the costs incurred for additional shipments, in addition to the time and expense encountered in having to restock the inventory more frequently. The supplier saves by making fewer shipments and can pass these savings onto the customer.

Orders can be submitted to a supplier by numerous methods, including but not limited to email, facsimile, paper mail or real time interfacing techniques.

In addition to making restocking orders, the inventory management system of the present invention is applicable to writing reports. These written reports can provide details related to current and future inventory needs (recommended inventory report), or explain the effect of varying parameters on inventory needs. Additionally, historical shipment reports provide a historical account of ORC shipments placed and received. There may also be provided an equivalent per page print cost report that calculates the monthly relative cost per page of A4 equivalent pages based on the ORC replacements that have been performed and the number of A4 equivalent pages printed. More specifically, this is based on the aggregate cost of inventory (cost of all ORCs replaced in the press) divided by the A4 equivalent printer page count. ORCs that last more than a month have their cost amortized over the months for which they are not ordered to maintain uniformity in the calculation of this per page cost.

The foregoing description has detailed the embodiments of the inventory management system most preferred. Variations of these embodiments will be readily apparent to those skilled in the art and, accordingly, the scope of the invention should be measured by the appended claims.

What is claimed is:

1. An inventory management system for at least one piece of equipment requiring routine maintenance for a plurality of items, each of said items being associated with a respective parameter that provides an estimate of servicing needs for said item, said system comprising:
    an inventory of replacements for said items;
    a computational element operatively coupled to said at least one piece of equipment and to each of said parameters;
    a tracking device operatively coupled to said computational element to derive a criteria to generate at least one order form that details current and future requirements of said items for said piece of equipment that are stocked within said inventory; and
    wherein said computational element includes a dormancy feature for at least one of said plurality of items, said dormancy feature being activated so that an associated parameter for one or more of the plurality of items is placed in a dormant state so that such associated parameters do not become a trigger point for the tracking device to generate an order for said one or more items.

2. The inventory management system of claim 1, wherein said at least one order form is directed to a supplier of said items, at a location different from said at least one piece of equipment.

3. The inventory management system of claim 1, wherein said criteria includes a delivery time to enable timely creation of said at least one order form to insure proper stocking of said inventory.

4. The inventory management system of claim 3, wherein said criteria includes a specified set of ship dates to enable timely creation of said at least one order form to insure proper stocking of said inventory.

5. The inventory management system of claim 4, wherein said criteria further comprises a plurality of optional ship dates, wherein each of said optional ship dates has an individual set of items for said piece of equipment.

6. The inventory management system of claim 4, wherein for each one of said specified set of ship dates an identical set of items for said piece of equipment are placed in the at least one order form.

7. The inventory management system of claim 1, wherein said criteria is responsive to changes made in shipping dates for replenishment of said items used to stock said inventory.

8. The inventory management system of claim 7, wherein said criteria is responsive to changes in shipping dates of replacements for said items, whereby said criteria adjusts to insure proper local inventory for items for said piece of equipment.

9. The inventory management system of claim 1, wherein said criteria prevents unnecessary shipping of replenishments for said items by arranging said order form such that shipments can occur based on a cost factor of shipping versus parts cost.

10. The inventory management system of claim 9, wherein said cost factor of shipping versus parts cost provides for early shipping of increased amounts of inexpensive items to avoid additional shipments.

11. The inventory management system of claim 1, wherein said piece of equipment is a printing press.

12. The inventory management system of claim 11, wherein said criteria includes at least an expected life for each of said items.

13. The inventory management system of claim 12, wherein said expected life remaining includes a parameter selected from at least one of the following parameters: a number of printer pages remaining before said item is exhausted; a number of clock time hours remaining before said item is exhausted; a number of power on hours remaining before said item is exhausted; and a number of hours of specific component processing pages remaining before said item is exhausted.

14. The inventory management system of claim 13, wherein said expected life remaining includes multiples of said parameters.

15. The inventory management system of claim 1, wherein said criteria is at least partially based on replacement part cost and shipping cost for said items.

16. The inventory management system of claim 1, wherein said criteria is at least partially based on a threshold that compares expected life of said items with usage of said equipment.

17. The inventory management system of claim 1, further comprising an electronic interface between said piece of equipment and a provider for supplies of said items, wherein said order form is transferred from said piece of equipment to said provider for supplies at a different location from said piece of equipment.

18. A computer implemented method of managing an inventory for serviceable equipment requiring routine maintenance for a plurality of items comprising the steps of:

providing an inventory of replacement parts for said items;

associating each of said items using a processor with a parameter that provides an estimate of servicing needs for said item;

tracking said parameters using a processor to identify replenishment needs for said inventory;

generating an order form for replacement parts of said items for said inventory based on estimated needs using a processor; and providing a dormancy feature for at least one of said plurality of items, the dormancy feature being activated so that an associated parameter for one or more of the plurality of items is placed in a dormant state so that such associated parameters do not become a trigger point for the tracking device to generate an order for said one or more items.

19. The method of managing an inventory of claim 18, wherein the generating step further comprises generating said order form based on current and future needs of said serviceable equipment.

20. The method of managing an inventory of claim 19, wherein the step of generating an order form further comprises establishing a criteria for ordering replacement parts wherein said criteria is used to create a reduced number of said order forms that are generated to replenish said inventory.

\* \* \* \* \*